United States Patent [19]

Minemura et al.

[11] Patent Number: 4,726,858
[45] Date of Patent: Feb. 23, 1988

[54] RECORDING MATERIAL

[75] Inventors: Tetsuro Minemura; Hisashi Ando, both of Hitachi; Isao Ikuta, Iwaki; Yoshiaki Kita, Katsuta, all of Japan

[73] Assignee: Hitachi, Ltd., Tokyo, Japan

[21] Appl. No.: 643,293

[22] Filed: Aug. 22, 1984

[30] Foreign Application Priority Data

| Aug. 24, 1983 [JP] | Japan | 58-153208 |
| Jun. 8, 1984 [JP] | Japan | 59-118956 |
| Jun. 25, 1984 [JP] | Japan | 59-130611 |

[51] Int. Cl.$^4$ .......... C22C 9/00; C22C 5/02; C22C 5/06; C22C 20/00
[52] U.S. Cl. .......... 148/300; 420/470; 420/489; 420/469; 420/507; 420/525; 420/502; 420/505; 420/501; 420/506
[58] Field of Search .......... 365/107, 153, 113, ; 369/284; 346/135.1; 148/39, 125, 403, 411, 436, 430, 432; 428/636, 637, 606; 420/471, 470, 469, 489, 507, 501, 505, 502, 506, 503, 525

[56] References Cited

U.S. PATENT DOCUMENTS

| 1,133,019 | 3/1915 | Gleason | 420/506 |
| 1,776,276 | 4/1928 | Williams | 420/506 |
| 1,960,740 | 5/1934 | Gray et al. | 420/489 |
| 3,117,003 | 1/1964 | Chen | 148/430 |
| 3,124,452 | 3/1964 | Kraft | 148/430 |
| 3,366,477 | 1/1968 | Eichelman et al. | 420/489 |
| 3,847,602 | 11/1974 | Blinov et al. | 420/489 |
| 3,868,651 | 2/1975 | Ovshinsky | 365/113 |
| 3,922,180 | 11/1975 | Fuchs et al. | 148/430 |
| 4,066,819 | 1/1978 | Anderson et al. | 420/507 |
| 4,122,240 | 10/1970 | Banas et al. | 148/39 |
| 4,237,468 | 12/1980 | Nahara et al. | 346/135.1 |
| 4,452,757 | 6/1984 | Kawauchi et al. | 420/471 |
| 4,466,940 | 8/1984 | Siewert et al. | 420/469 |
| 4,496,634 | 1/1985 | Cline | 428/611 |
| 4,585,494 | 4/1986 | Ashok et al. | 148/436 |

FOREIGN PATENT DOCUMENTS

| 458545 | 3/1970 | Japan | 420/470 |
| 140845 | 8/1982 | Japan | 420/470 |
| 57-164955 | 10/1982 | Japan | 148/432 |
| 5848649 | 3/1983 | Japan | 420/470 |

OTHER PUBLICATIONS

Weakliem et al., "Review and Analysis of Optical Recording Media," *Optical Engineering*, Mar.-Apr.-76, vol. 15, pp. 99-108.
Brodsky, "Multilayer Memory Element for Beam Addressable Memories," IBM Tech. Disclosure Bulletin, vol. 13, No. 10, 3-71.

Primary Examiner—L. Dewayne Rutledge
Assistant Examiner—Deborah Yee
Attorney, Agent, or Firm—Antonelli, Terry & Wands

[57] ABSTRACT

A recording material made of an alloy capable of exhibiting different spectral reflectances at an equal temperature, depending on a heating-cooling cycle to which the alloy is subjected. The alloy can possess in solid state different crystal structures at a first temperature higher than the room temperature and at a second temperature lower than the first temperature but not lower than the room temperature. A part of the surface of the alloy exhibits, as a result of being quenched from the first temperature, a crystal structure which is different from the crystal structure at the second temperature, while the other part possesses the crystal structure at the second temperature, so that these two parts exhibit different spectral reflectances. Using this recording medium, it is possible to record, reproduce and erase information by means of, for example, laser beams.

38 Claims, 26 Drawing Figures

RECORDING MATERIAL

BACKGROUND OF THE INVENTION

1. Field of the Invention

The present invention relates to a novel recording medium and a spectral reflectance changeable alloy (i.e. an alloy capable of changing its spectral reflectance). More particularly, the invention is concerned with an alloy which can be used as medium for recording or displaying information, as well as materials of sensors, through a change in the spectral reflectance as a result of a change in the crystal structure which takes place in response to light or heat energy applied to the alloy.

2. Description of the Prior Art

In recent years, there is an increasing demand for higher density and digitization of information recording, which in turn gives a rise to the demand for development of various information recording/reproducing technics. In particular, optical disc, which is capable of recording, erasing and reproducing information in cooperation with a laser beam, exhibits a higher density of recording than conventionally used magnetic discs, as described in "Industrial Rare Metal No. 80, 1983" (optical disc and material). Thus, the optical disc will become one of the most effective and practical information recording/reproducing system in the coming future.

The reproducing device making use of laser beam has been put into practical use under the name of "Compact Disc") (abbreviation "CD").

On the other hand, the presently available systems which enable recording of information can be sorted into two types: an unerasable type and a rewritable type. The unerasable type permits writing only once and does not allow erasure, while the rewritable type permits repetitional writing and erasure. The recording method of the unerasable type is to form fine convexities and concavities in the medium by breaking or shaping the medium by means of a laser beam, while the reading of the recorded information is conducted by making use of a change in the light reflectance due to interference of the laser beam caused by the minute concavities and convexities. For instance, it is well known to form convexities and concavities by melting or sublimation of a recording medium made of, for example, Te or its alloy, by means of a laser beam. This type of recording medium, however, involves problems such as toxicity.

On the other hand, photoelectromagnetic materials are major material as the rewritable type medium. The recording with this material is conducted by inverting local magnetic anisotropy in the medium at a temperature around Curie point or compensation point by the energy of a light, while the reproduction is conducted by a rotation amount of plane of polarization caused by the magnetic Faraday effect or magnetic kerr effect brought about by the polarized incident light. This recording/reproducing method is considered as being the most promising method using the medium of rewritable type and an intense study is being made with a prospect that this method will put into practical use within several years. Unfortunately, however, no material has been found which would provide a sufficiently large rotation amount of the plane of polarization. At the present stage, it is still impossible to obtain sufficiently high level of output such as S/N and C/N, despite various efforts such as lamination of the medium material.

Another known system of rewritable type makes use of a change in the reflectance caused by a reversible phase change between amorphous state and crystalline state of the recording medium material. An example of such a recording medium material is obtained by adding trace amounts of Ge and Sn to $TeO_x$, as disclosed in "National Technical Report Vol. 29, No. 5 (1983)". This system, however, suffers from a problem in that the instability of phase at normal temperature due to a low crystallization temperature of the amorphous phase effects on the reliability of a disc.

Meanwhile, Japanese Patent Application Laid-Open Publication No. 140845/82 discloses an alloy which exhibits a change in color. This alloy has a composition consisting essentially of 12 to 15 wt % of Al, 1 to 5 wt % of Ni and the balance Cu, and changes its color reversibly from RED to gold and vice versa across the martensite transformation temperature. The martensite transformation is a phenomenon which inevitably takes place when the temperature of the material has come down. That is to say, the color which is obtained when the material temperature is above the martensite transformation temperature cannot be maintained when the material temperature has come down below the martensite transformation temperature. To the contrary, the color obtained when the material temperature is below the martensite transformation temperature is changed into another color when the material temperature is raised above the martensite transformation temperature. Therefore, two different colors occuring above and below the martensite transformation temperature cannot be simultaneously obtained at an equal temperature of the material. This means that this principle making use of change in the color cannot be applied as a recording material.

SUMMARY OF THE INVENTION

OBJECT OF THE INVENTION

Accordingly, an object of the invention is to provide a recording material which can have locally different spectral reflectance at an equal temperature, as well as a method of producing such a recording material.

BRIEF SUMMARY OF THE INVENTION

To this end, according to an aspect of the invention, there is provided a recording material formed from an alloy having in solid state different crystal structures at a first temperature (high temperature) higher than the room temperature and at a second temperature (low temperature) lower than the first temperature, wherein the alloy has such an alloy composition that at least a part of the surface of the alloy forms, as a result of being quenched from the high temperature, a crystal structure which is different from the crystal structure at the low temperature obtained by non-quenching.

The recording material in accordance with the invention is adapted to be subjected to a local heating-quenching cycle or is locally supplied with energy instantaneously when it is in a specific solid phase state, so that the material becomes to have portions which respectively exhibit different spectral reflect ances or other physical properties at an equal temperature thereby enabling recording of information therein.

Further, the invention provides a spectral reflectance changeable alloy having in solid state different crystal structures at a first temperature higher than the room temperature and at a second temperature lower than the first temperature, wherein a part of the surface of the alloy possesses, as a result of being super-cooled from the first temperature, a crystal structure which is different from the crystal structure at the second temperature, while other part possesses the crystal structure at the second temperature thereby exhibiting a spectral reflectance different from that of the super-cooled crystal structure.

The alloy of the invention can have at least two different spectral reflectances at an equal temperature, by being subjected to heating-cooling treatment in solid phase state, so that it can change its spectral reflectance reversibly. More specifically, the alloy of the invention in the solid phase state can have phases of different crystal structures in at least two temperature regions. Therefore, the alloy exhibits, in the state where the high-temperature phase has been quenched, a spectral reflectance which is different from the spectral reflectance exhibited in the non-quenched standard state, i.e., the state having the low-temperature phase. Consequently, the spectral reflectance is reversibly changed by alternatingly conducting a heating-quenching at the temperature region of high-temperature phase and a heating-cooling at the temperature region of low-temperature phase.

The above and other objects, features and advantages of the invention will become more clear from the following description of the preferred embodiments taken in conjunction with the accompanying drawings.

DESCRIPTION OF THE PREFERRED EMBODIMENTS

Before turning to the detailed description of the embodiments, a theoretical approach will be made to the reversible change in the spectral reflectance in the alloy of the invention, with specific reference to FIG. 1.

Figure 1:
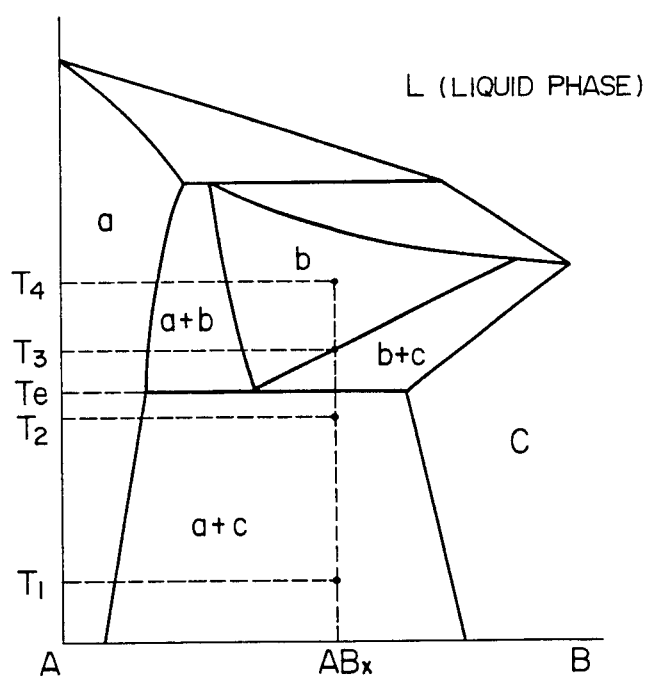
FIG. 1 is a schematic illustration of binary phase diagram of an alloy in accordance with the invention.

FIG. 1 is a phase diagram of a binary alloy having A and B components, and shows a solid solution (a) and intermetallic compounds (b) and (c). Assuming here that an alloy has a composition expressed by ABx, this alloy in solid phase state includes single (b)-phase and (b+c)-phase and (a+c)-phase. The crystal structure differs respectively in single phases of (a), (b) and (c), and different optical characteristics, e.g., spectral reflectance, are exhibited by different single phases and mixed phases. In this alloy, the (a+c)-phase is stable at the temperature $T_1$ which is usually the room temperature. When the alloy is quenched after being heated up to $T_4$, the (b)-phase is quenched to $T_1$. This (b)-phase may be transformed into a new phase, e.g., (b')-phase, when the same is quenched. Since this phase is different from the (a+c)-phase, the alloy exhibits a different spectral reflectance. When this quenched (b)-phase [or (b')-phase] is cooled after being heated up to a temperature $T_2$ which is below Te, this phase is transformed into (a+c)-phase thereby recovering the original spectral reflectance. By repeating these two heating and cooling cycles in a manner described, it is possible to cause a reversible change in the spectral reflectance.

(Alloy Composition)

The alloy in accordance with the invention should have different crystal structures when it is held at a high temperature and at a low temperature and should possess a quenched crystal structure when quenched from a high temperature. It is also necessary that the phase formed as a result of quenching be changed into the above-mentioned crystal structure at the low temperature, when the alloy after quenching is heated at a predetermined temperature. Preferably, the material exhibits the specific quenched crystal structure different from the structure ordinarily exhibited at the low temperature, when quenched at a rate of not smaller than $10^2$ °C./sec, more preferably not smaller than $10^3$ °C./sec.

The alloy in accordance with the invention preferably contains at least one of the elements belonging to group Ib (Cu, Ag, Au) in the periodic table, and at least one element selected from a group consisting of Zn, Cd, Al, Ga, In, Tl, Ge, Sn, As, Sb and Bi. More preferably, the alloy of the invention is a Cu-based alloy containing at least one of Al, Ga, In, Ge and Sn, and more preferably a Cu-based alloy containing at least one of Al, Ga, In, Ge and Sn and at least one of Ni, Mn, Fe and Cr as a third element.

According to another form, the alloy in accordance with the invention is a silver-based alloy containing at least one of Al, Cd and Zn and, more preferably, at least one of Cu, Al and Au as the third element.

According to still another form, the alloy of the invention is a gold-based alloy containing Al.

TABLE 1

| No. | Ag | Al | Au | Cu | Others |
|---|---|---|---|---|---|
| 1 |  | 14–16.5 |  | Bal. |  |
| 2 |  | " |  | " | Ni 0.01–20 (2.5–7.5) |
| 3 |  | " |  | " | Mn 0.01–15 |
| 4 |  | " |  | " | Fe 0.01–10 and/or Cr 0.01–10 |
| 5 |  |  |  | " | Ga 21–30 (22.5–25) |
| 6 |  | 0.01–3.0 (0.05–0.5) |  | " | Ga 21–30 (22.5–25) |
| 7 |  |  |  | " | In 20–40 (25–35) |
| 8 |  | 0.01–3.0 (0.05–0.5) |  | " | In 20–40 (25–35) |
| 9 |  |  |  | " | Ge 20–28 (25–35) |
| 10 |  | 0.01–3.0 (0.05–0.5) |  | " | Ge 20–28 (25–35) |
| 11 |  |  |  | " | Sn 16–35 (20–30) |
| 12 |  | 0.01–3.0 (0.05–0.5) |  | " | Sn 16–35 (20–30) |
| 13 |  | 2.5–4.0 | Bal. |  |  |
| 14 | Bal. | 6–10 |  |  |  |
| 15 | Bal. | 6–10 | 0.1–10 | 0.1–15 | (Au and/or Cu) |
| 16 | Bal. | 0.01–2.0 |  |  | Cd 43–59 |
| 17 | Bal. |  |  |  | Zn 30–46 |

Values appearing in ( ) show preferred ranges.

(Non-bulk and Method of Producing the Same)

In order to make the reflectance changeable, the alloy of the invention should be such one as to develop an super-cooled phase through a quenching after a heating. For attaining a high-speed formation and recording of information, the medium should have small heat capacity effective in a rapid heating and cooling. This is the reason why the medium in the form of non-bulk is preferred. More specifically, the material is preferably a non-bulk having such a volume that the change in the crystal structure takes place only in the desired minute area (referred to as "spot", hereinafter) over the full depth thereof, by an energy which is inputted to the spot. In other words, in order to form an information at a high density in the desired spot, the medium should have a non-bulk form with a small heat capacity, e.g. foil, film, thin wire or powder.

For recording the information in a spot at a high recording density of 20 Mega bits/cm$^2$ or higher, the medium preferably has a form of a film of 0.01 to 0.2 $\mu$m in thickness. In general, it is difficult to effect a plastic work on intermetallic compounds. For obtaining the medium in the form of a foil, film, thin wire or powder, it is the most effective way to directly quench and solidify into the desired form from gaseous or liquid phase. Examples of such methods are a PVD process (vacuum evaporation, sputtering and so forth), CVD process, melt-quenching method in which a melt is quenched and solidified by being poured onto the surface of a member having a high heat conductivity and rotating at high speed, particularly a metallic roll, electroplating, and chemical plating. When the medium is to be formed as a film or powder, the material is formed directly on a substrate or applied and bonded to the substrate. In applying the material to the substrate, it is important to use a binder which does not react with powder of the medium material when heated. It is effective also to coat the film or the layer of the medium on the substrate with a suitable material, in order to prevent oxidation of the medium material due to heating.

Preferably, the foil or thin wire is formed by melt quenching method to have a thickness or diameter not greater than 0.1 mm. For obtaining the foil or thin wire having grain size of not greater than 0.1 $\mu$m, the thickness or diameter should be not greater than 0.05 mm.

The powder can be formed suitably by a method called "atomizing method" which consists in atomizing the melt with a gas or liquid refrigerant and quenching into water to quench the atomized powder. The grain size of the powder is preferably not greater than 0.1 mm, and more preferably not greater than 1 $\mu$m.

The film can be formed by any one of known methods such as vacuum evaporation, sputtering, CVD, electroplating and chemical plating. Sputtering is preferably used for obtaining a film of a thickness not greater than 0.1 $\mu$m, because this method permits an easy control of alloy composition to facilitate the formation of the desired composition.

(Structure)

The alloy of the invention should exhibit different crystal structures at high temperature and at low temperature, and should possess a super-cooled phase so that the crystal structure normally exhibited at high temperature can be maintained even at the low temperature when the alloy is quenched from a high temperature. The super-cooled phase is preferably an intermetallic compound which has a regular lattice of Cs-Cl or DO$_3$ type, although it has a crystal structure of irregular lattice at high temperature. In order to obtain a large change in the optical properties, the alloy of the invention should be constituted mainly by the above-mentioned intermetallic compound. More preferably, the alloy has such a composition that the whole part of the alloy forms the intermetallic compound. This intermetallic compound is referred to also as an "electronic compound". Electronic compounds having alloy composition near the composition of 3/2 electronic compound (compound having a mean outer shell electron density e/a of 3/2) are used most suitably.

It is also preferred that the alloy in accordance with the invention is of an alloy composition capable of occurring a solid phase transformation, e.g. eutectoid transformation or peritectoid transformation. Such alloy exhibits a large difference in the spectral reflectance between the state quenched from a high temperature and a state non-quenched from the high temperature.

The alloy of the invention preferably has an ultrafine grain. The grain size preferably does not exceed 0.1 $\mu$m. Namely, the grain size is preferably not greater than the wavelength of visible rays, although a grain size smaller than the wavelength of semiconductor laser beam is acceptable.

(Properties)

The recording material according to the invention can have at least two different spectral reflectances at an equal temperature within the range of visible ray wavelength. More specifically, the alloy should possess, when quenched from a high temperature, a crystal structure (texture) which is different from that obtained when the same is not quenched from the same high temperature, the different crystal structures (textures) exhibiting different spectral reflectances.

The difference between the spectral reflectance of the crystal structure obtained by quenching and that of the crystal structure obtained by non-quenching is preferably not smaller than 5% and, more preferably, not smaller than 10%. A greater difference in spectral reflectance permits an easy discrimination by color, which in turn offers remarkable advantages in various uses which will be explained later.

The light source for the spectral reflection may be visible rays or electromagnetic waves other than visible rays, and even ultraviolet and infrared rays can be used for this purpose.

The alloy of the invention can reversibly change properties other than the spectral reflectance, e.g. electric resistance, refractive index of light, polarization ratio of light, transmittance of light and so forth. This feature enables the alloy of the invention to be applied to various uses such as recording and reproduction of information, as well as reproducing and detecting means for display units, sensors and so forth.

The spectral reflectance is closely related to the surface roughness of the alloy. Thus, in order to obtain a difference in spectral reflectance of not smaller than 10% at least in the visible ray region as mentioned previously, it is preferred that the alloy surface is mirror-finished at least in the portion to be used.

(Uses)

The alloy in accordance with the invention can vary its physical and electric properties such as spectral reflectance to electromagnetic waves, electric resistance, refractive index, polarization ratio, transmittance and so forth, when it experiences a change in the crystal structure locally or wholly as a result of quenching after a heating. This feature makes it possible to apply the alloy to various uses such as elements for recording information, display element, sensor element and so forth.

As the means for recording and reproducing information, it is possible to use electric energy in the form of voltage or current, as well as electromagnetic waves. The electromagnetic waves may be used in the form of visible rays, radiant heat, infrared rays, ultraviolet rays, light from photographic flash lamp, electron beams, proton beams, laser beams such as argon laser beam and semiconductor laser beam, electromagnetic wave produced by sparking discharge at high voltage, and so forth.

The alloy of the invention can be used suitably as the material of optical disc which serves as a recording medium, by making an efficient use of a change in the spectral reflectance owing to the irradiation of the aforesaid electric energy or electromagnetic waves. The alloy is applicable to any one of known optical discs such as digital audio disc (referred to as "DAD" or compact disc), video disc and memory disc. The optical disc made of alloy of the invention may be of the reproduction only type, unerasable recording type and rewritable type. The advantage of the optical disc can be fully enjoyed when the disc is of the rewritable type. The energy for recording information may be applied continuously or discontinuously in the form of pulses. In the latter case, the information can be recorded in the form of digital signals.

When the alloy of the invention is used as a recording medium of an optical disc, information can be recorded and reproduced in accordance with the following principle. Firstly, the recording is conducted by locally heating and then quenching the recording medium so that the crystal structure peculiar to the high-temperature region is maintained even at the low-temperature region. This crystal structure can carry the information signal. Alternatively, the medium is locally heated so that a low-temperature phase is maintained even at the high-temperature region. This low-temperature phase can bear the information. For reproducing the recorded information, the difference in the optical property between the heated portion and non-heated portion of the medium is detected. It is possible to erase the recorded information by heating the portion of the medium carrying the information to a temperature below or above the temperature to which the medium was heated at the time of recording. Preferably, the light is a laser beam, more preferably, a laser beam having a short wavelength. When the alloy of the invention is used as the material of the optical disc, a large difference in spectral reflectance between the heated portion and the non-heated portion is obtained at the wavelength region around 500 nm or 800 nm, so that the best reproduction can be attained by using a laser beam having such a wavelength. Preferably, the recording and reproduction is conducted by using the same laser beam source, while the erasure of the information is conducted with another laser beam having a lower energy density than the laser beam used in the recording.

The alloy of the invention used as the medium material of an optical disc offers a great advantage in that it permits a visual check of the state of the disc, i.e. whether the information has been recorded already or not.

When used as a material of a display element, the alloy of the invention can record letters, patterns and symbols through the change in the spectral reflectance at the visible ray wavelength region, without using any paint. Since the change in the spectral reflectance can be obtained in the wavelength region of visible rays, the recorded information can be read visually. This display element permits erasure of the recorded information and even a repeated recording and erasure. The information can be held almost permanently if desired. Example of application of this display element are dials of watches, accessories, and so forth.

An example of the sensor element made of the alloy of the invention is a temperature sensor which makes use of a change in the spectral reflectance in the visible ray wavelength region. Namely, a sensor element is made from an alloy of the invention, the phase-changing temperature (temperature at which the phase is changed to high-temperature phase) of which is known, and the sensor element is held at a temperature around the temperature to be measured. It is possible to roughly detect the temperature by holding the super-cooled phase through a super-cooling of the sensor.

(Production Method)

According to another aspect of the invention, there is provided a method of producing a spectral reflectance changeable alloy comprising: preparing an alloy possessing in solid state different crystal structures at a first temperature higher than the room temperature and at a second temperature lower than the first temperature; and forming, in a part of the surface of the alloy, a region having a crystal structure which is different from the crystal structure at the second temperature by supercooling the part; whereby the region formed by the supercooling exhibits a spectral reflectance which is different from the spectral reflectance exhibited by the region having the crystal structure at the second temperature.

Further, the invention provides a method of producing a spectral reflectance changeable alloy comprising: preparing an alloy possessing in solid state different crystal structures at a first temperature higher than the room temperature and at a second temperature lower than the first temperature; forming, over the entire surface of the alloy, a crystal structure which is different from the crystal structure at the second temperature by super-cooling the entire surface from the first temperature; and heating a part of the surface of the alloy to the second temperature to form a region having the crystal structure at the second temperature; whereby the region formed by the super-cooling exhibits a spectral reflectance which is different from the spectral reflectance exhibited by the region having the crystal structure at the second temperature.

The rate of cooling from the first temperature is preferably not smaller than $10^2$ °C./sec, more preferably not smaller than $10^3$ °C./sec

EMBODIMENTS OF THE INVENTION

Example 1

Figure 2:
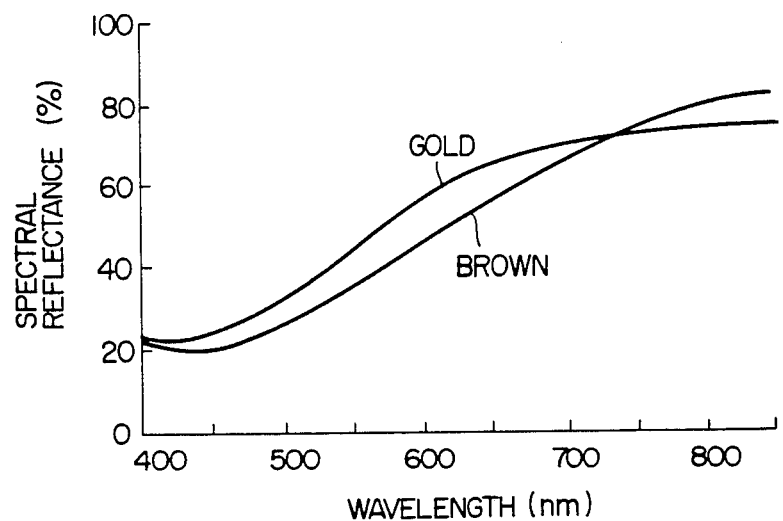
FIG. 2 is a diagram showing spectral reflectances of a crystal structure of the alloy of the invention obtained by a quenching from a first temperature and a crystal structure of the same alloy obtained by a non-quenching.

A Cu alloy containing 15 wt % of Al was melted in a vacuum high-frequency induction furnace and was then solidified into an ingot. This ingot exhibited a gold color. The ingot was melted and the melt was poured onto the surface of a single roll rotating at a high speed or into gaps between multiple rolls so as to be quenched and solidified into a ribbon-like foil. The single roll was a Cr-placed Cu roll having a diameter of 300 mm, while the multiple rolls were Cu-Be rolls having a diameter of 120 mm. In both cases, the roll peripheral speed was set at 10 to 20 m/sec. The melting of the mother alloy was conducted by using a quartz nozzle, at a rate of 10 g per charge. The foil formed by the quenching had a width of 5 mm, thickness of 40 $\mu$m and a length of several meters. This foil exhibited a brown color at the room temperature. A part of this foil was heated to and maintained at 350° C. for 1 minute. The heated part of the foil changed its color into gold at the room temperature. Spectral reflectances at the heated and non-heated parts of the foil were measured, the result of which is shown in FIG. 2. More specifically, FIG. 2 is a chart showing the relationships between the wavelengths of brown and gold colors and spectral reflectance. As will be seen from this Figure, there is a distinctive difference in the spectral reflectance between the portion of brown color and the portion of gold color over the entire region of wavelength except the region around 720 nm. The difference well reaches about 10% at the maximum. It is, therefore, possible to discriminate the heated part and the non-heated part from each other. These colors can be held almost permanently at the room temperature. This suggests that information in the form of signals, letters or symbols can be stored in brown color against a background of gold color, by a quenching following an instantaneous local heating by means of a laser beam irradiation. Alternatively, the information such as signals can be stored in gold color against a background of brown color, by an instantaneous local heating by the irradiation with laser beam.

Example 2

Reversible change in color was confirmed with a thin film which was formed by sputtering vacuum evaporation. A disc of 100 mm dia. and 5 mm thick was cut out from the ingot as obtained in Example 1 and used as the target of the sputtering. A glass plate of 0.8 mm thick was used as the substrate for sputtering vacuum evaporation. In order to prevent the sputtered film from being oxidized by heating and exfoliated from the substrate during writing and erasure, the surface of the film was coated with an $SiO_2$ protective film of 30 nm thick formed by vacuum evaporation. A DC-magnetron type sputtering method was used for the vacuum evaporation of the alloy film, while RF type sputtering method was used for the vacuum evaporation of the $SiO_2$ film. The sputtering power was selected to range between 140 and 200 W, while the substrate temperature was maintained at 200° C. The vessel used for the sputtering was evacuated to a level of about $10^{-5}$ Torr and was charged with Ar gas to a level of 5 to 30 mTorr. The thickness of the alloy film was varied within the range of 0.05 to 10 $\mu$m, while the thickness of the $SiO_2$ protective layer was maintained constantly at about 30 nm. The alloy film of 300 nm thick formed under the above-explained sputtering vacuum evaporation condition had ultra-fine crystals of a grain size of about 30 nm. It is, therefore, considered that there will be no influence of crystal grains on the recording, reproduction and erasure of information. The alloy film in its as vacuum evaporated state exhibited a brown color.

Figure 3:
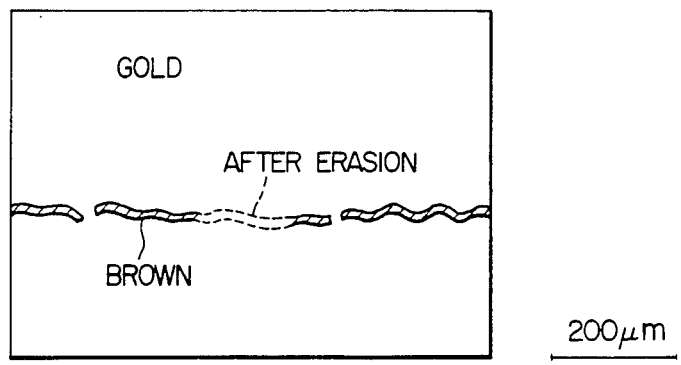
FIG. 3 is an illustration of a color exhibited by a thin film of an alloy of the invention formed on a substrate when a laser beam is applied to the thin film.

The alloy film formed by sputtering was heated to and maintained at 350° for 1 minute to change its color into gold. Then, recording and erasure of information were conducted by a local heating by an Ar laser beam followed by a quenching. The color of the alloy was substantially as shown in FIG. 3. The Ar laser beam was of continuous oscillation. The specimen was placed on a manually movable stage and was moved while focusing the laser beam on the film surface so that the film surface was scanned by the laser beam. The portion irradiated with the laser beam changed its color into brown, so that a pattern as hatched and partly shown by broken lines was written in brown color against the gold background. The writing Ar laser beam had a power of 200 mW and a spot diameter of 10 $\mu$m. Each substrate was heat-treated beforehand such that the film exhibits a gold color. Then, the portion of the film indicated by broken lines was scanned with an out-of-focus laser beam of a power density lower than that of the beam used in the writing, in the vertical direction as viewed in FIG. 3. In consequence, the information written in brown color was erased and the original gold color was recovered in the region shown by broken lines. This suggests that the alloy of the invention in the form of a thin film also permits a recording and erasure through a change in the color. It was confirmed that any desired number of writing and erasure cycles can be attained.

The specimen exhibiting brown color over its entire surface at room temperature, in its as prepared state by the process explained before, was scanned with an Ar laser beam of 50 mW or so. The portion of the specimen scanned with the Ar laser beam changed its color into gold at room temperature. This gold color was clearly distinguishable from the brown color exhibited by the background. This means that this specimen permits a recording of information therein. Then, the whole part of the specimen was heated to and maintained at 350° C. for 1 minute. As a result, the portion colored in brown was changed into gold at the room temperature when cooled to room temperature. This suggests that the recorded information is erasable.

Example 3

The ingot as obtained in Example 1 was powdered and the change in the color of powder was examined. More specifically, the ingot was mechanically cut into chips which were then pulverized into powder. The ingot is so brittle that the chips obtained by mechanical cutting are considerably fine. These fine chips were further pulverized into powder of grain sizes of about −100 mesh. The powder in its as pulverized state exhibited gold color but it was confirmed that the powder changes its color into brown by a water-quenching following heating at 800° C. for 1 minutes.

The powder obtained from the ingot was further ground into fine powder of grain size on the order of several micron meters. The fine powder was mixed with an organic matter and the mixture was applied to a glass substrate. The substrate was then fired in a non-oxidizing atmosphere to form an alloy film of about 100 $\mu$m thick. An $SiO_2$ film of about 30 nm thick was coated on the alloy film by vacuum evaporation. The glass substrate had been mirror-polished and the alloy film also was mirror-polished after formation. The alloy film thus formed originally exhibited a gold color but changed its color into brown as it is heated by a laser beam to a temperature at which a transformation to another phase occurs.

Example 4

A foil of about 40 $\mu$m thick was prepared in the same method as Example 1 from a Cu based alloy containing 14 wt % of Al and 10 wt % of Ni. The foil exhibited a brown color at the room temperature, but changed its color into gold by a 2-minute heating at 350° C. followed by an air-cooling. At the temperature range of between 220° and 300° C., the foil exhibited a color between brown and gold and, at temperature range of between 300° and 600° C., a gold color. At temperatures above 600° C., the foil exhibited a brown color. Thus, the foil of gold color changes its color into brown by being heated to 600° C. or higher and the original gold color is recovered as the same is heated to a temperature lower than 550° C.

Figure 4A:
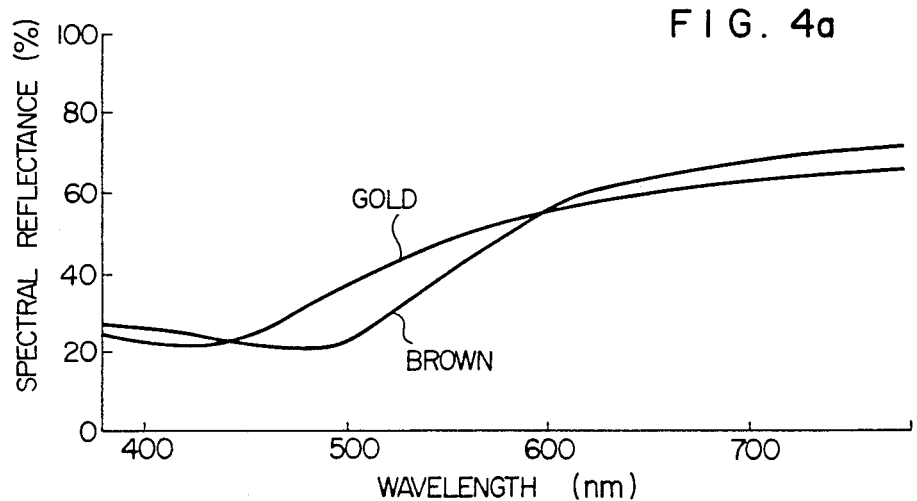
FIGS. 4 to 23 are diagrams similar to that in FIG. 2 but showing spectral differences of other examples of the alloy in accordance with the invention.

FIG. 4a shows the result of measurement of the spectral reflectance of the above-mentioned copper-based alloy containing 14 wt % of Al and 10 wt % of Ni, for each of the above-mentioned two modes. It will be seen that each mode exhibits specific pattern of change in the reflectance, and both modes are clearly distinguishable over the entire wavelength region except about 450 and 600 nm. These two modes of heating-quenching cycle were repeated and a constant reversible change was confirmed. Namely, the distinctive difference between these two modes was maintained.

Figure 4B:
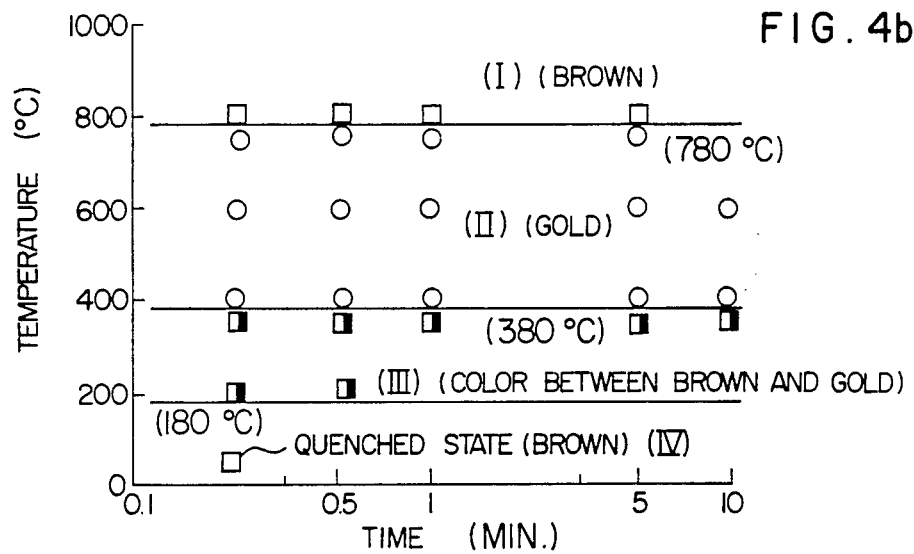

FIG. 4b is a diagram showing the relationship between the heating temperature and the color. A brown color is obtained by a quenching from the region (I). This brown color is changed as illustrated when the specimen is heated to regions (II) and (III), respectively. No change in color is caused by heating to the region (IV). The axis of abscissa represents the time duration of the heating.

Example 5

A foil of about 40 μm thick was formed in the same method as Example 1, from a Cu-based alloy containing 15 wt % of Al and 9 wt % of Ni. This foil originally exhibited red-purple color at the room temperature, but changed its color to light gold when heated at 350° C. for 2 minutes followed by an air-cooling. At the temperature range of between 220° and 300° C., the foil exhibited a color between red-purple and light gold and, at temperature range of between 300° and 600° C., a light gold color. At temperatures above 600° C., the foil exhibited a red-purple color. Thus, the foil of light gold color changes its color into red-purple by being heated to 600° C. or higher and the original light gold color is recovered as the same is heated to a temperature lower than 550° C.

Figure 5:
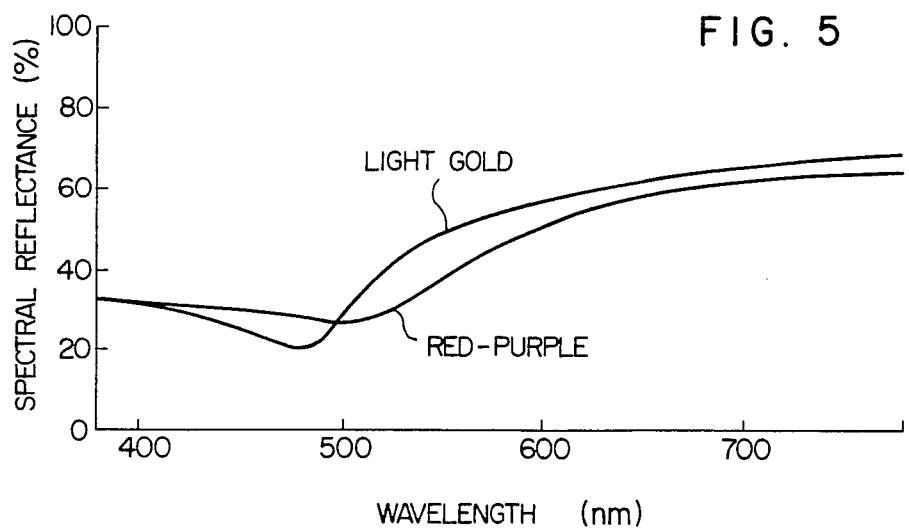

FIG. 5 shows the result of measurement of the spectral reflectance in each of the above-mentioned two modes. It will be seen that each mode exhibits specific pattern of change in the reflectance, and both modes are clearly distinguishable over the entire wavelength region except about 500 nm. The two modes of heating-quenching cycle were repeated and a constant reversible change was confirmed. Namely, the distinctive difference between these two modes was maintained.

Example 6

A Cu-based alloy containing 16 wt % of Al and 12 wt % of Ni in molten state was poured onto the peripheral surface of a liquid-cooled quenching roll rotating at high speed, so as to be cooled by the roll into a ribbon-like foil of about 40 μm thick. This foil exhibited a purple color at the room temperature, but changed its color to light brown when heated at 350° C. for 2 minutes followed by an air-cooling. At the temperature range of between 220° and 300° C., the foil exhibited a color between purple and light brown and, at temperature range of between 300° and 650° C., a light brown color. At temperatures above 700° C., the foil exhibited a purple color. Thus, the foil of light brown color changes its color into purple by being heated to 700° C. or higher and the original light brown color is recovered as the same is heated to a temperature lower than 600° C.

Figure 6:
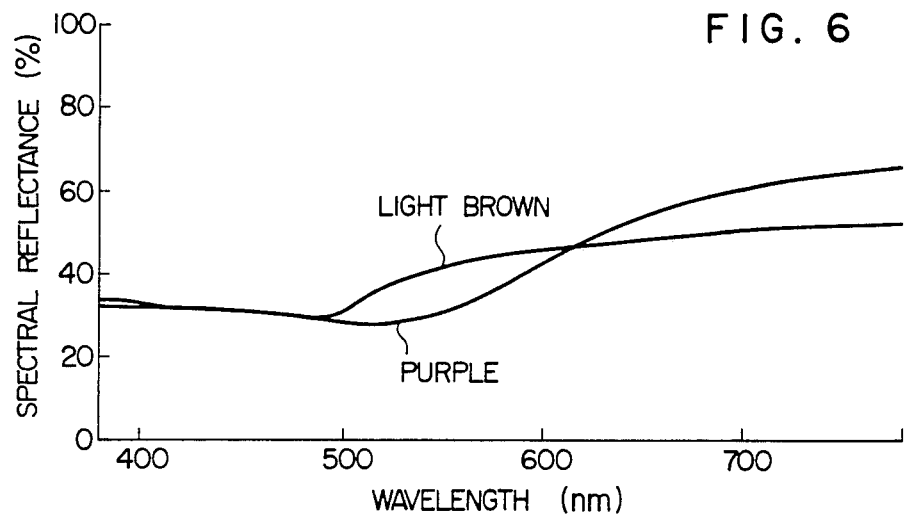

FIG. 6 shows the result of measurement of the spectral reflectance in each of the above-mentioned two modes. It will be seen that each mode exhibits specific pattern of change in the reflectance, and both modes are clearly distinguishable over the entire wavelength region except region below 490 nm and the region around 620 nm. The two modes of heating-quenching cycle were repeated and a constant reversible change was confirmed.

Example 7

A thin alloy film of the same composition as that in Example 4 was formed to have a thickness of 50 nm on a glass substrate by sputtering vacuum evaporation. A protective film of $Al_2O_3$ or $SiO_2$ was coated by sputtering vacuum evaporation on this thin alloy film. The alloy foil thus formed exhibited a brown color but changed its color into gold after a 2-minute heating at 350° C. followed by an air-cooling. This alloy foil exhibited the spectral reflectance substantially equal to that shown in FIG. 6. A specimen of this film, exhibiting gold color over its entire surface, was scanned by a semiconductor laser beam of 30 mW and having a spot diameter of 2 μm. As a result, a line of brown color of a width of about 2 μm, observable at the room temperature, was scribed against the gold background. Then, a laser beam of a reduced power density or in a slightly out-of-focus condition was applied to scan the brown color line. As a result, the brown color of the line was reversibly changed into the original gold color, i.e., the line of brown color was erased. It was confirmed that this reversible change could take place repeatedly, and that this favorable result could be attained also when Ar laser beam was used in place of the semiconductor laser beam.

The specimen in its as sputtering vacuum evaporated state, exhibiting brown color over its entire surface, was scanned with a semiconductor laser beam of a power of 20 mW. The portion scanned by the laser beam changed its color to gold to become distinguishable from the background at the room temperature. It is thus possible to record information in this medium by a laser beam. A subsequent 2-minute heating at 350° C. of the whole portion of the specimen caused a change of color into gold, thus enabling the erasure of the recorded information. It was confirmed that the same result was obtainable also when an Ar laser beam was used in place of the semiconductor laser beam.

Example 8

A ribbon-like foil of about 40 μm thick was formed in the same method as Example 1, from a Cu-based alloy containing 15 wt % of Al and 5 wt % of Fe. This foil exhibited brown color at the room temperature, but changed its color to gold when heated at 350° C. for 2 minutes followed by an air-cooling. The color was further changed to brown when the foil was heated at 750° C. for 2 minutes followed by a water-quenching. At the temperature range of between 200° and 300° C., the foil exhibited a color between brown and light gold and, at temperature range of between 300° and 700° C., a gold color. At temperatures above 750° C., the foil exhibited a brown color. This color change is not affected substantially by the time duration of heating. Thus, the foil of gold color changes its color into brown by being heated to 750° C. or higher and the original gold color is recovered as the same is heated to a temperature lower than 700° C.

Figure 7:
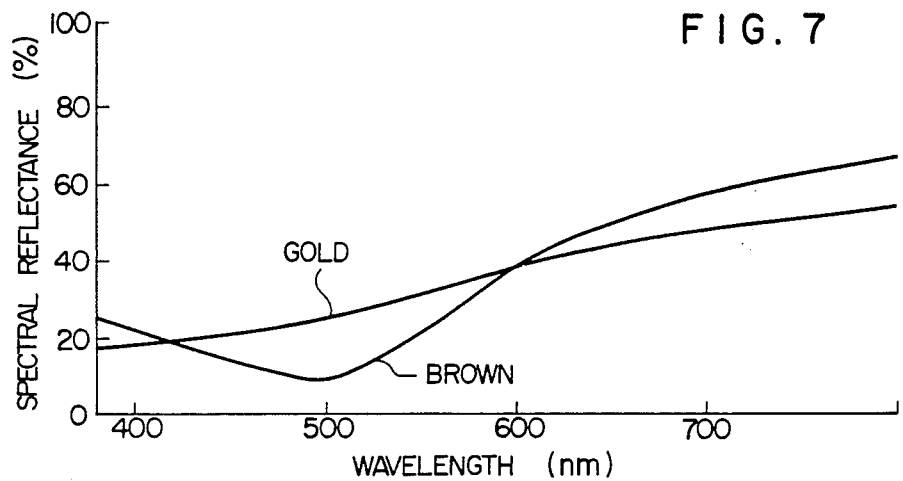

FIG. 7 shows the result of measurement of the spectral reflectance in each of the above-mentioned two modes. It will be seen that each mode exhibits specific pattern of change in the reflectance, and both modes are clearly distinguishable over the entire wavelength region except about 400 nm and 600 nm. The two modes of heating-quenching cycle were repeated and a constant reversible change was confirmed.

Example 9

A thin alloy film of the same composition as that in Example 8 was formed to have a thickness of 50 nm on a glass substrate by sputtering vacuum evaporation. A protective film of $Al_2O_3$ or $SiO_2$ was coated by sputtering vacuum evaporation on this thin alloy film. The alloy film thus formed exhibited a brown color but changed its color into gold after a 2-minute heating at 350° C. followed by an air-cooling. This alloy film exhibited the spectral reflectance substantially equal to that shown in FIG. 7. A specimen of this film, exhibiting gold color over its entire surface, was irradiated with semiconductor laser beam in the same manner as stated before. As a result, a line of brown color of a width of about 2 μm, observable at the room temperature, was scribed against the gold background, thereby it was confirmed that the information could be recorded. Then, a laser beam of a reduced power density or in a slightly out-of-focus condition was applied to scan the brown color line. As a result, the brown color of the line was reversibly changed into the original gold color, i.e., the line of brown color was erased. It was confirmed that this reversible change could take place repeatedly.

The specimen in its as sputtering vacuum evaporated state, exhibiting at the room temperature a brown color over its entire surface, was scanned with a semiconductor laser beam of a power of 20 mW. The portion scanned by the laser beam changed its color to gold to become distinguishable from the background at the room temperature. It is thus possible to record information in this medium by a laser beam. A subsequent 2-minute heating at 350° C. of the whole portion of the specimen caused a change of color into gold, thus enabling the erasure of the recorded information. It was confirmed that the same result was obtainable also when an Ar laser beam was used in place of the semiconductor laser beam.

A similar experiment was conducted by using a Cu-base alloy containing 14.5 wt % Al and 3 wt % Cr, and it was confirmed that the same effects as explained above were obtainable also with this alloy.

Example 10

A ribbon-like foil of about 40 μm thick was formed in the same method as Example 1, from a Cu-based alloy containing 14 wt % of Al and 5 wt % of Mn. This foil exhibited purple color at the room temperature, but changed its color to white-yellow when heated at 350° C. for 2 minutes followed by an air-cooling (in contrast to the Cu-Al binary alloy which changes the color between brown and gold, the alloy of Example 10 containing Mn changes its color between purple and white-yellow). The color was further changed to purple by a subsequent 2-minute heating at 750° C. followed by water-quenching. At the temperature range of between 200° and 300° C., the foil exhibited a color between purple and white-yellow and, at temperature range of between 350° and 700° C., white-yellow color. At temperatures above 750° C., the foil exhibited a purple color. This color change is not affected substantially by the time duration of heating. Thus, the foil of white-yellow color changes its color into purple by being heated to 750° C. or higher and the original white-yellow color is recovered as the same is heated to a temperature lower than 700° C.

Figure 8:
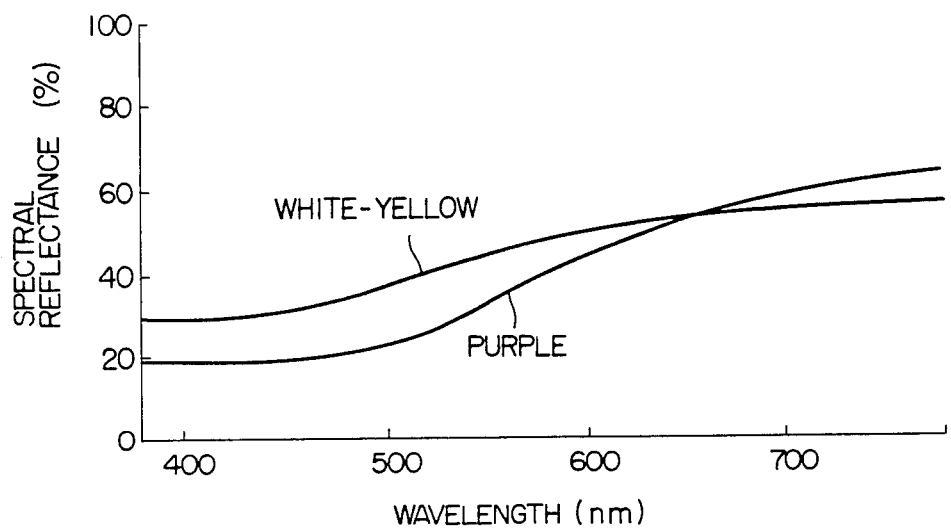

FIG. 8 shows the result of measurement of the spectral reflectance in each of the above-mentioned two modes. It will be seen that each mode exhibits specific pattern of change in the reflectance, and both modes are clearly distinguishable over the entire wavelength region except about 450 nm. The two modes of heating-quenching cycle were repeated and a constant reversible change was confirmed. Namely, the distinctive difference between these two modes was maintained.

Example 11

A thin alloy film of the same composition as that in Example 10 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited purple color but changed its color into white-yellow after a 2-minute heating at 350° C. followed by an air-cooling. This alloy film exhibited the spectral reflectance substantially same as that shown in FIG. 8. A specimen of this film, exhibiting white-yellow color over its entire surface, was irradiated with semiconductor laser beam in the same manner as stated before. As a result, a line of purple color of a width of about 2 μm, observable at the room temperature, was scribed against the white-yellow background, thereby it was confirmed that the information could be recorded. Then, a laser beam of a reduced power density or in a slightly out-of-focus condition was applied to scan the purple color line. As a result, the purple color of the line was reversibly changed into the original white-yellow color, i.e., the line of purple color was erased. It was confirmed that this reversible change could take place repeatedly.

The specimen in its as sputtering vacuum evaporated state, exhibiting at the room temperature a purple color over its entire surface, was scanned with a semiconductor laser beam of a power of 20 mW. The portion scanned by the laser beam changed its color to white-yellow to become distinguishable from the background at the room temperature. It is thus possible to record information in this medium by a laser beam. A subsequent 2-minute heating at 350° C. of the whole portion of the specimen caused a change of color into white-yellow, thus enabling the erasure of the recorded information. It was confirmed that the same result was obtainable also when an Ar laser beam was used in place of the semiconductor laser beam.

Example 12

Figure 9:
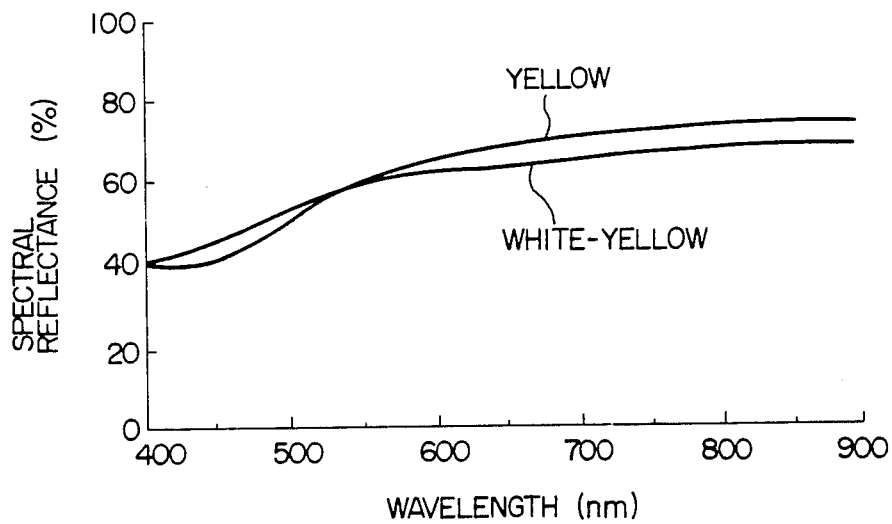

A ribbon-like foil of about 30 μm was prepared by the same method as Example 1, from a Cu-based alloy containing 22.5 wt % of Ga. This foil exhibited a color of yellow at the room temperature. When a part of this foil was heated at 650° C. for 2 minutes in the Ar gas atmosphere, it still exhibited a color of yellow at the room temperature; whereas when it was heated at 500° C. for 2 minutes, it exhibited a color of white-yellow at the room temperature. FIG. 9 shows the result of measurement of spectral reflectances of the foils which have undergone the 2-minute heating at 650° C. and 500° C., respectively. The yellow portion ($\beta$-phase) and the white-yellow portion [($\zeta+\gamma$)-phase] exhibited different reflectances over the entire wavelength region except 400 nm and 30 nm. This tells that both portions are distinguishable from each other.

Example 13

An alloy film of Cu-based alloy containing 22.5 wt % of Ga was formed by sputtering vacuum evaporation to have a thickness of 50 nm on a glass substrate heated beforehand to 200° C., and a protective film of $SiO_2$ of 100 nm was coated on the alloy film. The alloy film exhibited a color of white-yellow at the room temperature, but the color was changed to yellow when cooled to the room temperature after 1-minute heating at 650° C. The spectral reflectances of both alloy films were measured and a tendency similar to that shown in FIG. 9 was confirmed. The thin film specimen exhibiting white-yellow color in its entire surface was scanned by a semiconductor laser beam having a power of 30 mW and a spot diameter of 2 $\mu$m. An yellow line of 2 $\mu$m wide on the white-yellow background was confirmed through an optical-microscopic observation of the portion irradiated with the laser beam. Subsequently, the portion of the alloy film in which the yellow line had been scribed was scanned with a laser beam having a smaller power density than the scribing laser beam with an increased spot diameter of 5 $\mu$m. As a result, the portion in which the yellow line had been scribed changed its color to white-yellow, i.e. to the same color as the background. It was confirmed that this recording and erasing cycle could be conducted repeatedly as desired. A similar experiment was conducted using Ar laser beam in place of the semiconductor laser beam and an equivalent effect was confirmed.

Example 14

A thin alloy film produced by the same method as Example 13 and exhibiting white-yellow color at room temperature was heated at 650° C. for 1 minute to become a thin film specimen exhibiting yellow color over its entire surface. The specimen was then scanned by a semiconductor laser beam of 20 mW power having a spot diameter of 2 $\mu$m. The portion scanned by the laser beam changed its color to white-yellow to become distinguishable from yellow background. Subsequently, the white-yellow portion scanned by the laser beam was scanned by another laser beam having a beam diameter of 5 $\mu$m and a higher energy density than the first-mentioned laser beam. As a result, the white-yellow color portion was changed into yellow, i.e., into the same color as the background. It was confirmed that this recording and erasing cycle could be repeated for any desired number of times.

Example 15

A ribbon-like foil of about 40 $\mu$m thick was formed in the same method as Example 1, from a Cu-based alloy containing 25 wt % of Ga and 1 wt % of Al. This foil exhibited yellow color at the room temperature, but changed its color to white-yellow when heated at 500° C. for 2 minutes followed by an air-cooling. The color was further changed to yellow by a subsequent 2-minute heating at 650° C. followed by water-quenching. At the temperature range of between 300° and 380° C., the foil exhibited a color between yellow and white-yellow and, at temperature range of between 400° and 600° C., white-yellow color. At temperatures above 750° C., the foil exhibited a yellow color. This color change is not affected substantially by the time duration of heating. Thus, the foil of white-yellow color changes its color into yellow by being heated to 650° C. or higher and the original white-yellow color is recovered as the same is heated at a temperature lower than 600° C.

Figure 10:
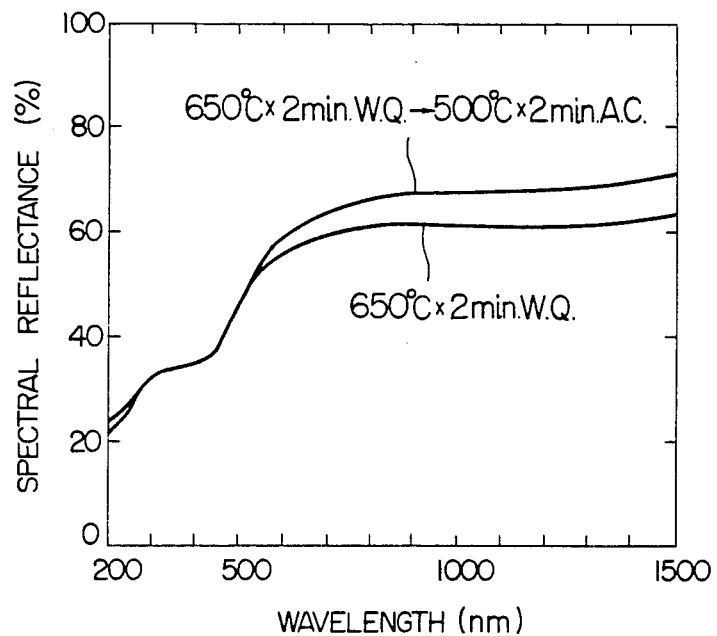

FIG. 10 shows the result of measurement of the spectral reflectance in each of the above-mentioned two modes. It will be seen that each mode exhibits specific pattern of change in the reflectance, and both modes are clearly distinguishable over the entire wavelength region except the region around 530 nm. The two modes of heating-quenching cycle were repeated and a constant reproducibility of reversible change was confirmed.

Example 16

A thin alloy film of the same composition as that in Example 15 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited a yellow color but changed its color into white-yellow after a 2-minute heating at 550° C. followed by an air-cooling. This alloy film exhibited the spectral reflectance substantially same as that shown in FIG. 10. A specimen of this film, exhibiting white-yellow color over its entire surface, was scanned by a semiconductor laser beam in the same manner as stated before. As a result, a line of yellow color of a width of about 2 $\mu$m, observable at the room temperature, was scribed against the white-yellow background, thereby it was confirmed that the information could be recorded. Then, a laser beam of a reduced power or in a slightly out-of-focus condition was applied to scan the yellow color line. As a result, the yellow color of the line was reversibly changed into the original white-yellow color, i.e., the line of yellow color was erased.

The specimen in its as sputtered vacuum evaporated states, exhibiting at the room temperature a yellow color over its entire surface, was scanned with a semiconductor laser beam of a power of 20 mW. The portion scanned by the laser beam changed its color to white-yellow to become distinguishable from the background at the room temperature. It is thus possible to record information in this medium by a laser beam. A subsequent 2-minute heating at 550° C. of the whole portion of the specimen caused a change of color into white-yellow, thus enabling the erasure of the recorded information.

Example 17

Figure 11:
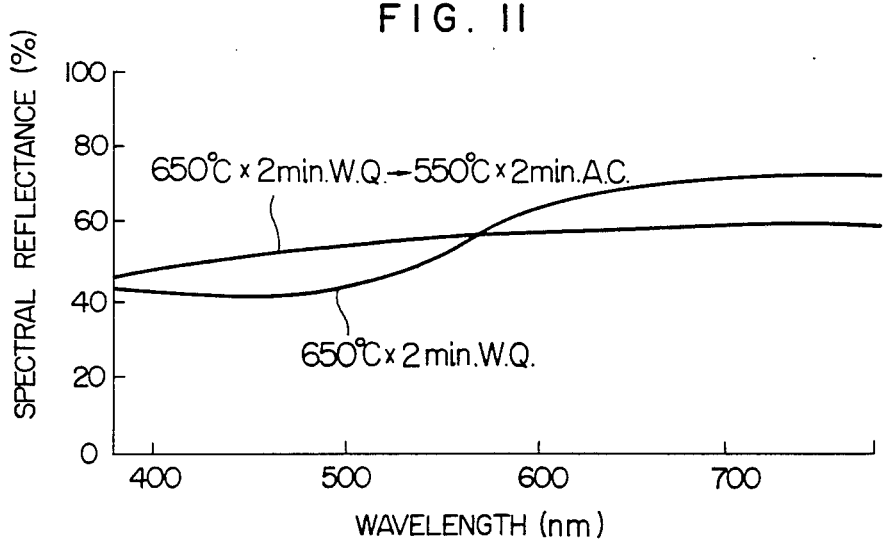

A ribbon-like foil of about 40 $\mu$m thick was formed in the same method as Example 1, from a Cu-based alloy containing 31 wt % of In. This foil exhibited light brown color at the room temperature, but changed its color to silver-white when heated at 550° C. for 2 minutes followed by an air-cooling. The color was further changed to light brown by a subsequent 2-minute heating at 650° C. followed by water-quenching. FIG. 11 shows the result of measurement of the spectral reflectance in each of the above-mentioned two modes. It will be seen that each mode exhibits specific pattern of change in the reflectance, and both modes are clearly distinguishable over the entire wavelength region except the region around 570 nm.

Example 18

A thin alloy film of the same composition as that in Example 17 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited a light brown color but changed its color into silver-white after a 2-minute heating at 550° C. followed by an air-cooling. This alloy film exhibited the spectral reflectance substantially same as that shown in FIG. 11. A specimen of this film, exhibiting silver-white color over its entire surface, was scanned by a semiconductor laser beam of a power not greater than 30 mW and having a spot diameter of 2 $\mu$m. As a result, a line of light brown color of a width of about 2 $\mu$m, observable at the room temperature, was scribed against the silver-white background, thereby it was confirmed that the information could be recorded. Then, a laser beam of a reduced power or in a slightly out-of-focus condition was applied to scan the light brown color line. As a result, the light brown color of the line was reversibly changed into the original silver-white color, i.e., the line of light brown color was erased.

The specimen in its as sputtered vacuum evaporated state, exhibiting at the room temperature a light brown color over its entire surface, was scanned with a semiconductor laser beam of a power of 20 mW. The portion scanned by the laser beam changed its color to silver-white to become distinguishable from the background at the room temperature. It is thus possible to record information in this medium by a laser beam. A subsequent 2-minute heating at 550° C. of the whole portion of the specimen caused a change of color wholly into silver-white.

Example 19

A ribbon-like foil of about 40 $\mu$m thick was formed in the same method as Example 1, from a Cu-based alloy containing 25 wt % of In and 1.0 wt % of Al. This foil originally exhibited light brown color at the room temperature, but changed its color to silver-white when heated at 550° C. for 2 minutes followed by an air-cooling. The color was further changed to light brown when the foil was water-quenched after a 2-minute heating at 650° C. At the temperature range of between 370° and 450° C., the foil exhibited a color between silver-white and light brown and, at temperature range of between 500° and 640° C., a silver-white color. At temperatures above 650° C., the foil exhibited a light brown color. This color change is not affected substantially by the time duration of heating. Thus, the foil of silver-white color changes its color into light brown by being heated to 650° C. or higher and the original silver-white color is recovered as the same is heated at a temperature lower than 600° C.

Figure 12:
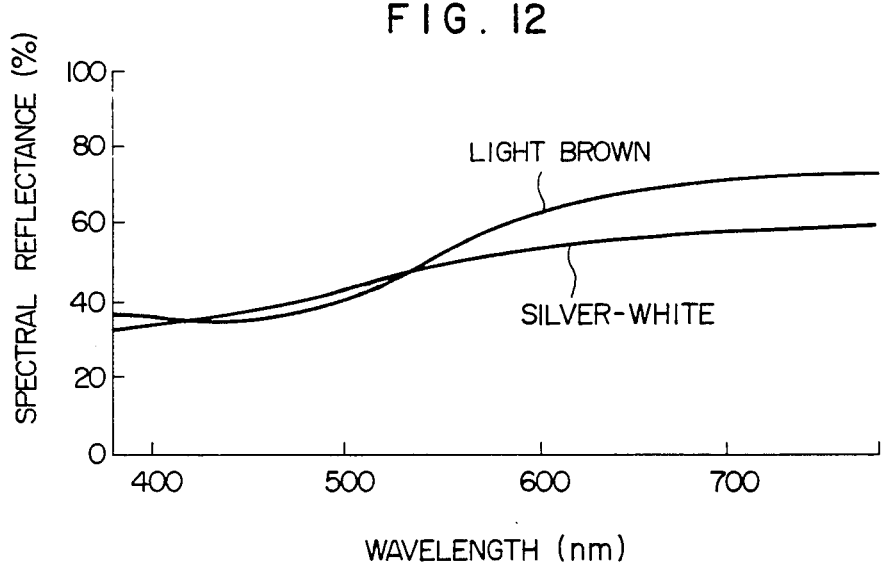

FIG. 12 shows the result of measurement of the spectral reflectance in each of the above-mentioned two modes. It will be seen that each mode exhibits specific pattern of change in the reflectance, and both modes are clearly distinguishable over the entire wavelength region except about 420 nm and 530 nm. The two modes of heating-quenching cycle were repeated and a constant reproducibility of reversible change was confirmed.

Example 20

A thin alloy film of the same composition as that in Example 19 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited a light brown color but changed its color into silver-white after a 2-minute heating at 550° C. followed by an air-cooling. This alloy film exhibited the spectral reflectance substantially same as that shown in FIG. 12. A specimen of this film, exhibiting silver-white color over its entire surface, was scanned by a semiconductor laser beam in the same manner as stated before. As a result, a line of light brown color of a width of about 2 $\mu$m, observable at the room temperature, was scribed against the silver-white background. It was thus confirmed that this material could be used as a recording medium. Then, a laser beam of a reduced power or in a slightly out-of-focus condition was applied to scan the light brown color line. As a result, the light brown color of the line was reversibly changed into the original silver-white color, i.e., the line of light brown color was erased.

The specimen in its as sputtered vacuum evaporated state, exhibiting at the room temperature a light brown color over its entire surface, was scanned with a semiconductor laser beam of a power of 20 mW. The portion scanned by the laser beam changed its color to silver-white to become distinguishable from the background at the room temperature. It is thus possible to record information in this medium by a laser beam. A subsequent 2-minute heating at 550° C. of the whole portion of the specimen caused a change of color wholly into silver-white.

Example 21

Figure 13:
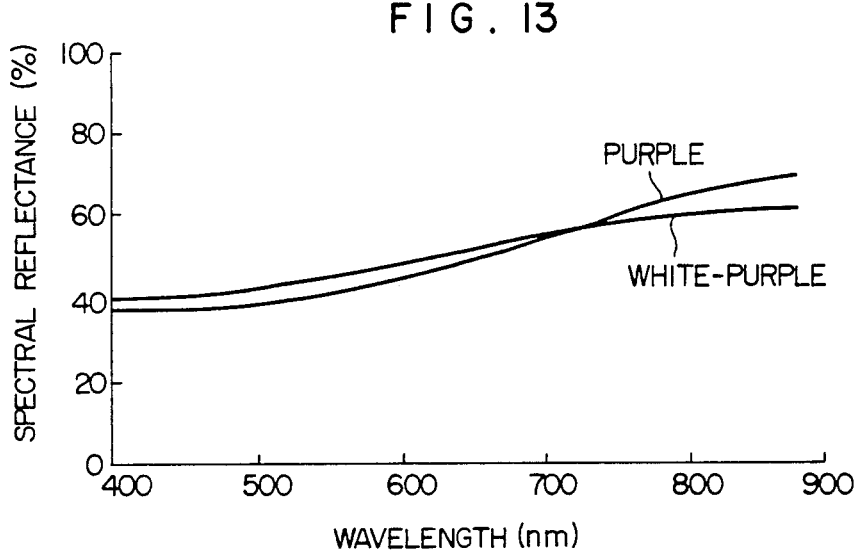

A ribbon-like foil of about 30 $\mu$m thick was prepared by the same method as Example 1, from a Cu-based alloy containing 22.5 wt % of Ge. This foil exhibited a color of purple at the room temperature. When a part of this foil was heated at 500° C. for 2 minutes in the Ar gas atmosphere, it still exhibited a color of purple at the room temperature; whereas when it was heated at 650° C. for 2 minutes, it exhibited a color of white-purple at the room temperature. FIG. 13 shows the result of measurement of spectral reflectances of the foils which have undergone the 2 minute heating at 500° C. and 650° C., respectively. The purple portion [($\zeta+\epsilon_1$)-phase] and the white-purple portion [($\zeta+\epsilon$)-phase] exhibited different reflectances over the entire wavelength region except a region around 700 nm. This tells that both portions are distinguishable from each other.

Example 22

A thin alloy film of a Cu-based alloy containing 22.5 wt % of Ge was formed to have a thickness of 50 nm on a glass substrate by sputtering vacuum evaporation. A protective film of $SiO_2$ was coated by sputtering vacuum evaporation to a thickness of 100 nm on this thin alloy film. The alloy film thus formed exhibited a white-purple color at the room temperature but changed its color into purple after a 1-minute heating at 500° C. followed by an air-cooling. The alloy film in both colors exhibited the spectral reflectances substantially the same as that shown in FIG. 13. A specimen of this film, exhibiting purple color over its entire surface, was scanned by a semiconductor laser beam of a power of 30 mW and having a spot diameter of 2 μm. An optical-microscopic observation proved a line of white-purple color of a width of 2 μm, observable at the room temperature, was scribed against the purple background, thereby it was confirmed that the information could be recorded. Then, a laser beam of a spot diameter of 5 μm and with reduced energy density was applied to scan the white-purple color line. As a result, the white-purple color of the line was changed into purple, i.e., the same color as the background, thus confirming the erasability of information. It was confirmed that this recording and erasing cycle could be repeated for any desired number of times.

Example 23

A thin film specimen prepared by the same method as Example 22, exhibiting white-purple color at the room temperature, was heated at 650° C. for 1 minute to obtain a thin film exhibiting white-purple color over its entire surface. Then, a semiconductor laser of a power of 20 mW or so and having a spot diameter of 2 μm was applied to scan the specimen. As a result, the portion scanned by the laser beam changed its color into purple to become distinguishable from the white-purple background.

Then, a semiconductor laser beam of a spot diameter of 5 μm and having a higher energy density than that of the scribing laser beam was applied to scan the purple portion, as a result this portion changed its color into white-purple, i.e., to the same color as the background. This recording and erasing cycle could be repeated for any desired number of times.

Example 24

A ribbon-like foil of about 40 μm thick was formed from a-Cu-based alloy containing 22 wt % of Ge and 1.0wt % of Al. This foil exhibited purple color at the room temperature, but changed its color to white-purple when heated at 550° C. for 2 minutes followed by an air-cooling. The color was further changed to purple when the foil was water-quenched after a 2-minute heating at 650° C. At the temperature range of between 300° and 380° C., the foil exhibited a color between purple and white-purple and, at temperature range of between 400° and 600° C., a white-purple color. At temperatures above 650° C., the foil exhibited a purple color. This color change is not affected substantially by the time duration of heating. Thus, the foil of white-purple color changes its color into purple by being heated to 650° C. or higher and the original white-purple color is recovered as the same is heated at a temperature lower than 600° C.

Figure 14:
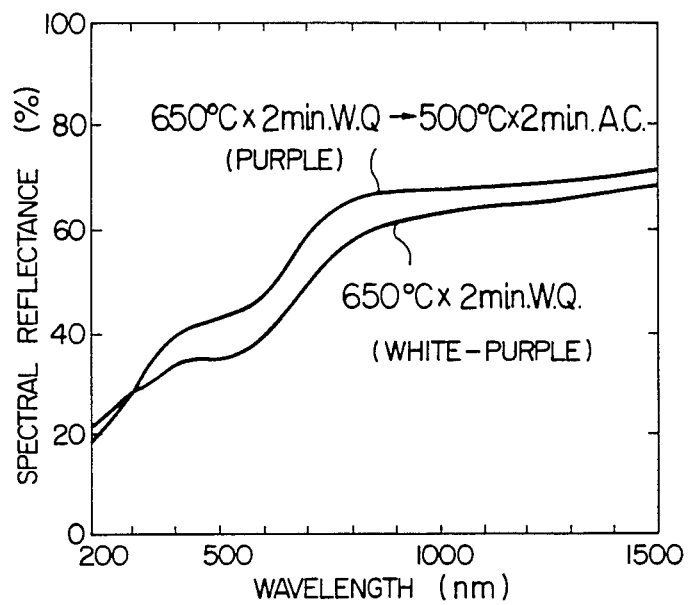

FIG. 14 shows the result of measurement of the spectral reflectance in each of the above-mentioned two modes. It will be seen that each mode exhibits specific pattern of change in the reflectance, and both modes are clearly distinguishable over the entire wavelength region except region around 680 nm. The two modes of heating-quenching cycle were repeated and a constant reproducibility of reversible change was confirmed.

Example 25

A thin alloy film of the same composition as that in Example 24 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited a purple color but changed its color into white-purple after a 2-minute heating at 550° C. followed by an air-cooling. This alloy film exhibited the spectral reflectance substantially same as that shown in FIG. 14. A specimen of this film, exhibiting white-purple color over its entire surface, was scanned by a semiconductor laser beam in the same manner as stated before. As a result, a line of purple color of a width of about 2 μm, observable at the room temperature, was scribed against the white-purple background. It was thus confirmed that this material could be used as a recording medium. Then, a laser beam of a reduced power or in a slightly out-of-focus condition was applied to scan the purple color line. As a result, the purple color of the line was reversibly changed into the white-purple color same as the background, i.e., the line of purple color was erased.

The specimen in its as sputtering vacuum evaporated state, exhibiting at the room temperature a purple color over its entire surface, was scanned with a semiconductor laser beam of a power of 20 mW. The portion scanned by the laser beam changed its color to white-purple to become distinguishable from the background at the room temperature. It is thus possible to record information in this medium by a laser beam. A subsequent 2-minute heating of the whole portion at 550° C. changed the color wholly into white-purple.

Example 26

Figure 15:
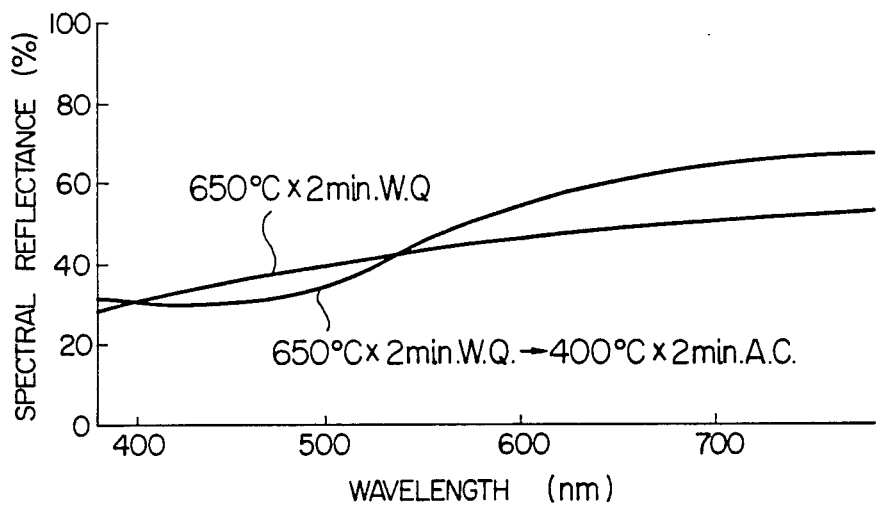

A ribbon-like foil of about 40 μm thick was prepared by the same method as Example 1, from a Cu-based alloy containing 30 wt % of Sn. This foil exhibited a color of gold at the room temperature, but changed its color into silver-white as a result of a 2-minute heating at 400° C. followed by air-cooling. The ribbon was then heated at 650° C. for 2 minute and then water-quenched. As a result, the color was changed into gold. The spectral reflectances of ribbon after two heating-cooling modes were measured to obtain a result as shown in FIG. 15. Both modes exhibited peculiar patterns of change in the spectral reflectance and were distinguishable over the entire wavelength region except a region around 540 nm.

Example 27

A thin alloy film of the same composition as that in Example 26 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited a gold color but changed its color into silver-white after a 2-minute heating at 400° C. followed by an air-cooling. This alloy film exhibited the spectral reflectance substantially same as that shown in FIG. 15. A specimen of this film, exhibiting silver-white color over its entire surface, was scanned by a semiconductor laser beam of a spot diameter of about 20 μm and power not greater than 30 mW. As a result, a line of gold color of a width of about 2 μm, observable at the room temperature, was scribed against the silver-white background. It was thus confirmed that this material could be used as a recording medium. Then, a laser beam of a reduced power or in a slightly out-of-focus condition was applied to scan the gold color line. As a result, the gold color of the line was reversibly changed into the silver-white color same as the background, i.e., the line of gold color was erased. This reversible color change could take place repeatedly.

The specimen in its as sputtered vacuum evaporated state, exhibiting a gold color at the room temperature over its entire surface, was scanned by a semiconductor laser of 20 mW power. The portion scanned by the laser beam changed its color into silver-white which is distinguishable from the color of the background at the room temperature, thus proving the possibility of recording. A subsequent 2-minute heating at 400° C. of the whole portion of the specimen caused a change of color wholly into silver-white, thus enabling the erasure of the recorded information. The same effect was confirmed also when an Ar laser beam was used in place of the semiconductor laser beam.

Example 28

A ribbon-like foil of about 40 μm thick was prepared by the same method as Example 1, from a Cu-based alloy containing 20 wt % of Sn and 1.0 wt % of Al. This foil exhibited a color of gold at the room temperature, but changed its color into silver-white as a result of a 2-minute heating at 500° C. followed by an air-cooling. The foil was then heated at 650° C. for 2 minute and then water-quenched. As a result, the color was changed into gold. The foil exhibited a color between gold and silver-white at temperature range of between 300° and 380° C. and white-silver color at temperatures range of between 400° and 550° C. At temperatures of 600° C. or higher, it exhibited a gold color. This color change is not affected substantially by the time duration of heating. Thus, the foil changed to silver-white color changes its color into gold by being heated to 600° C. or higher and the gold color of foil is changed again to silver-white as the foil is heated at temperature below 550° C.

Figure 16:
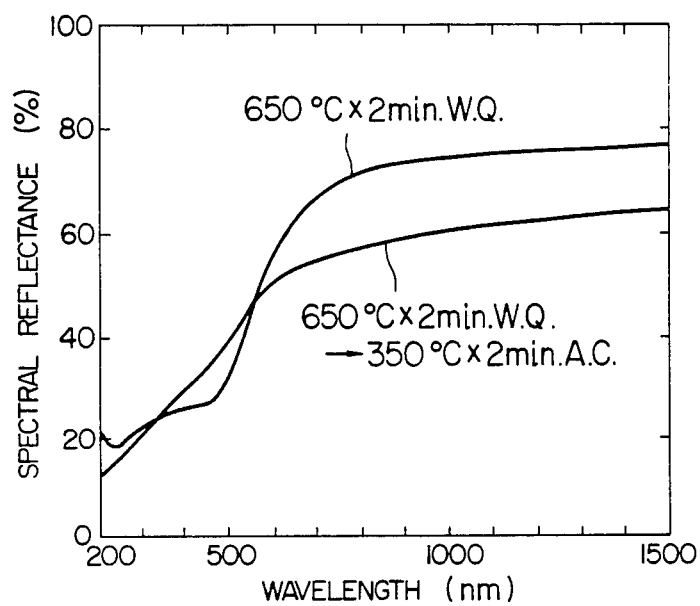

FIG. 16 shows the spectral reflectances of these two heating-quenching modes. It will be seen that each mode exhibits its peculiar pattern of change in the spectral reflectance and both modes are distinguishable over the entire wavelength region except the region of about 630 nm. These two modes of heating-quenching were repeated and a constant reversible change was confirmed, namely, the difference between two modes was maintained.

Example 29

A thin alloy film of the same composition as that in Example 28 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited a gold color but changed its color into silver-white after a 2-minute heating at 550° C. followed by an air-cooling. This alloy film exhibited the spectral reflectance substantially same as that shown in FIG. 16. A specimen of this film, exhibiting silver-white color over its entire surface, was scanned by a semiconductor laser beam in the same manner as stated before. As a result of an observation at the room temperature, it was confirmed that a line of gold color of a width of about 2 μm, observable at the room temperature, was scribed against the silver-white background. It was thus confirmed that this material could be used as a recording medium. Then, a laser beam of a reduced power or in a slightly out-of-focus condition was applied to scan the gold color line. As a result, the gold color of the line was reversibly changed into the silver-white color same as the background, i.e., the line of gold color was erased.

The specimen in its as sputtered vacuum evaporated state, exhibiting a gold color at the room temperature over its entire surface, was scanned by a semiconductor laser of 20 mW power. The portion scanned by the laser beam changed its color into silver-white which is distinguishable from the color of the background, thus proving the possibility of recording by laser beam. A subsequent 2-minute heating at 550° C. of the whole portion of the specimen caused a change of color wholly into silver-white.

Example 30

Figure 17A:
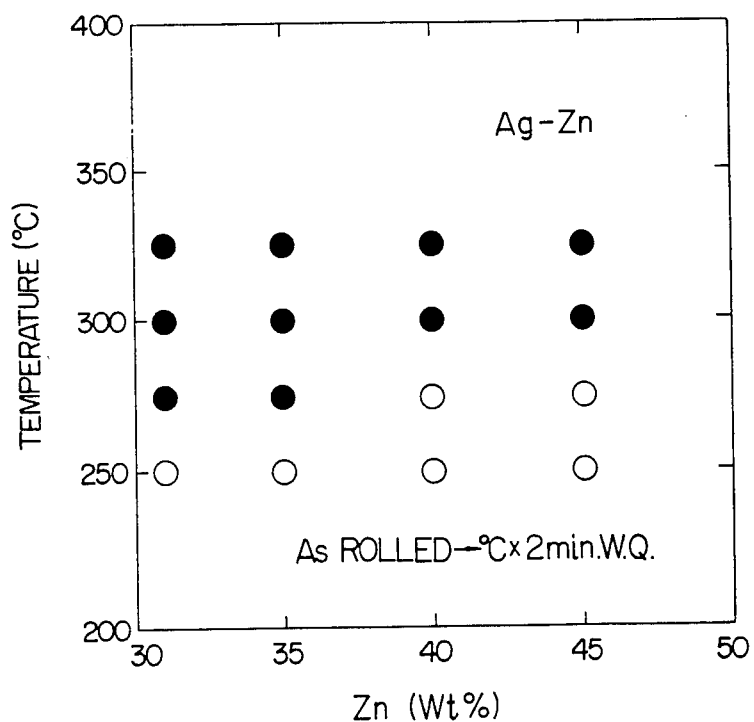
Figure 17B:
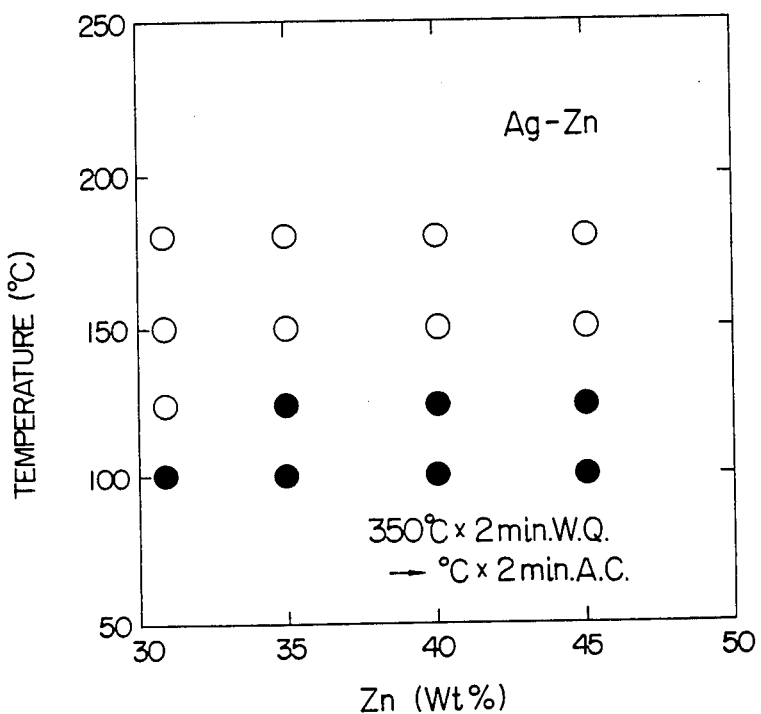
Figure 18A:
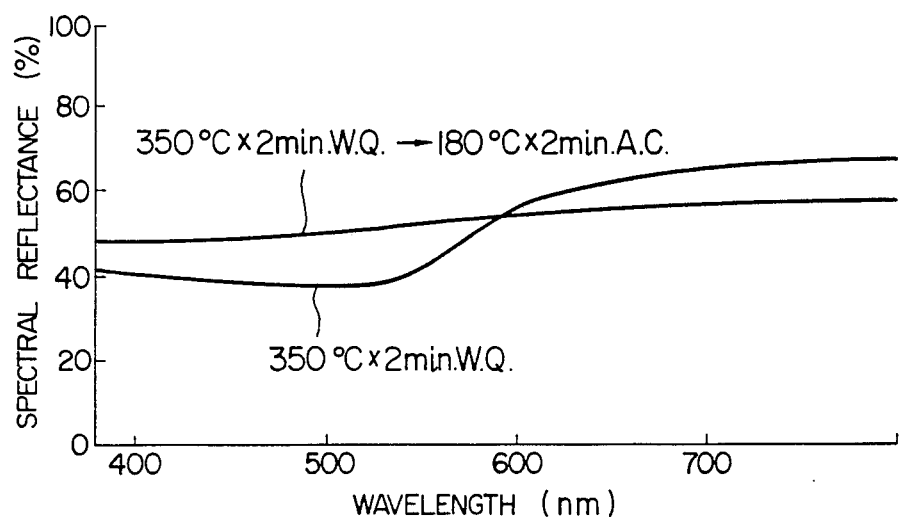
Figure 18B:
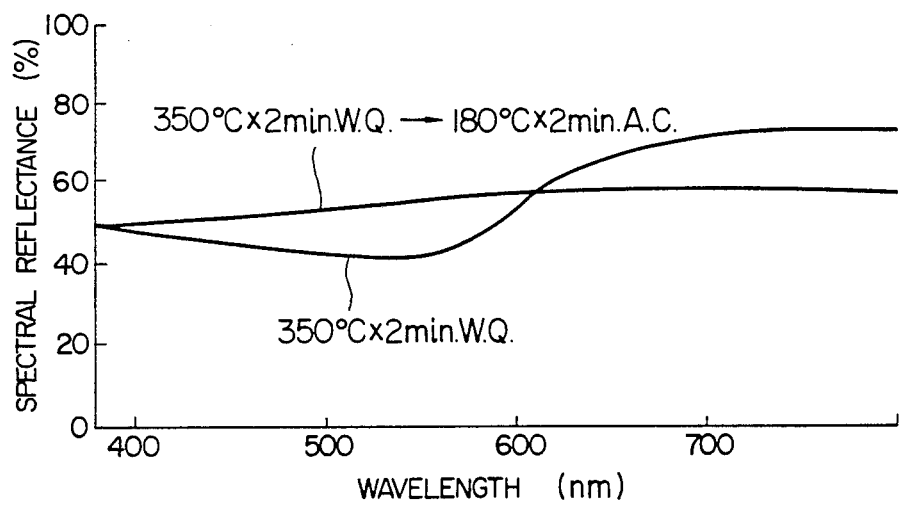

Ribbons of 50 μm thick and 5 mm wide were formed from an Ag-based alloy containing 35 wt % of Zn and another Ag-based alloy containing 40 wt % of Zn, by the same method as Example 1. These ribbons exhibited pink color at the room temperature but changed their colors into silver-white as a result of a 2-minute heating at 200° C. The pink color of both alloys was recovered as these alloys were quenched after a heating at 300° C. FIG. 17a is a diagram showing the colors of the alloys in their as produced states when the alloys were water-quenched after 2-minute heating at respective temperatures. The solid circle ● indicates the pink color, while the white circle indicates the silver-white color. As will be seen from this Figure, change in color is observed between 250° and 275° C. and 275° and 300° C. depending on the alloy composition. FIG. 17b is a diagram showing the colors of the alloys when the alloys were heated to respective temperatures for 2 minutes following water-quenching after 2-minute heating at 350° C. The solid circle ● indicates the pink color, while the white circle ● indicates the silver-white color. As will be seen from this Figure, change in color is observed between 100° and 125° C. and 125° and 150° C. depending on the alloy composition. FIGS. 18a and 18b show the spectral reflectances of Ag-based alloys containing 35% of Zn and 40% of Zn, respectively. The spectral reflectances at the pink color and the silver-white color exhibit distinctive difference within the wavelength region of 400 to 800 nm, except the wavelength of 570 nm or 600 nm, and the difference well reaches 10% or more.

Example 31

An Ag-based alloy containing 40 wt % of Zn was melted in an argon gas atmosphere and was solidified into a cylindrical form of 120 mm dia. A disc of 100 mm dia. and ˙5 mm thick was cut out from this cylinder and used as the target for the sputtering vacuum evaporation.

The sputtering vacuum evaporation was conducted by using a DC-magnetron type apparatus and a hard glass sheet of 26 mm dia. and 1.2 mm thick as the substrate, to obtain a film of 80 nm thick at the substrate temperature of 200° C. with the sputtering power of 150 mW. An Ar gas of 20 mTorr was used as the sputtering atomosphere. A protective film of $SiO_2$ or $Al_2O_3$ was coated by RF-sputtering on the alloy film to a thickness of about 20 nm, as the protective film. The alloy film in its as sputtering vacuum evaporated state exhibited a silver-white color but changed its color into pink as a result of 2-minute heat-treatment at 350° C. followed by water-quenching. The color was changed again to silver-white after a similar heat treatment at 200° C. Thus, the color change similar to that experienced by the foil or ribbon was confirmed also with the film formed by sputtering vacuum evaporation.

Example 32

An alloy film of Ag-based alloy containing 40 wt % of Zn was formed by a sputtering vacuum evaporation in the same way as Example 31, and a recording, reproduction and erasure were conducted on this film by means of a laser beam. A semiconductor laser of wavelength of 830 nm or an Ar laser beam of wavelength of 488 nm was used a the laser beam in this Example. The silver-white film surface was scanned with the laser beam while varying the laser beam power between 10 and 50 mW and varying the beam diameter between 1 and 10 μm. Consequently, the line scanned by the laser beam changed the color into pink. The width of the thus scribed pink line could be varied from about 1 μm to 20 μm by changing the laser power. After scribing a plurality of such lines, a laser beam is applied to scan the film surface across these lines. By this scanning, the change in the color was detected as a change in the D.C. voltage level on the order of about 20%, owing to the change in the spectral reflectance. These pink lines were erased by heating the film as a whole to a temperature of about 200° C. or scanning the film with a laser beam of a low power density.

Example 33

Figure 19:
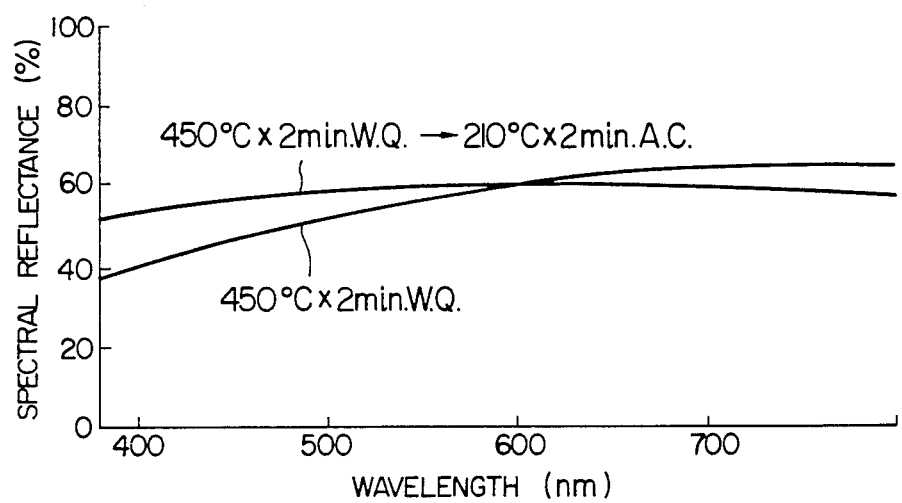

A ribbon-like foil of about 40 μm thick was prepared by the same method as Example 1, from an Ag-based alloy containing 7.5 wt % of Al. This foil exhibited a color of light gold at the room temperature, but changed its color into silver-white as a result of a 2-minute heating at 210° C. followed by an air-cooling. The foil was then heated at 450° C. for 2 minute and then water-quenched. As a result, the color was changed into light gold. FIG. 19 shows the spectral reflectances of these two heating modes. It will be seen that each mode exhibits its peculiar pattern of change in the spectral reflectance and both modes are distinguishable over the entire wavelength region except the region around 620 nm.

Example 34

A thin alloy film of the same composition as that in Example 33 was formed to have a thickness of 50 nm on a glass substrate by sputtering vacuum evaporation. A protective film of Al$_2$O$_3$ or SiO$_2$ was coated by sputtering vacuum evaporation to a thickness of 50 nm on this thin alloy film. The alloy film thus formed exhibited a light gold color but changed its color into silver-white after a 2-minute heating at 210° C. followed by an air-cooling. This alloy film exhibited the spectral reflectance substantially same as that shown in FIG. 19. A specimen of this film, exhibiting silver-white color over its entire surface, was scanned by a semiconductor laser beam having a spot diameter of about 2 μm and a power of not greater than 30 mW. As a result of an observation at the room temperature, it was confirmed that a line of light gold color of a width of about 2 μm was scribed against the silver-white background. Then, a laser beam of a reduced power or in a slightly out-of-focus condition was applied to scan the light gold color line. As a result, the light gold color of the line was reversibly changed into the silver-white color same as the background. It was confirmed also that this reversible change could take place regardless of the number of repetition.

The specimen exhibiting light gold color at the room temperature over its entire surface was scanned by a semiconductor laser of 20 mW power. The portion scanned by the laser beam changed its color at the room temperature into silver-white which is distinguishable from the color of the background, thus proving the possibility of recording by laser beam.

Example 35

Figure 20:
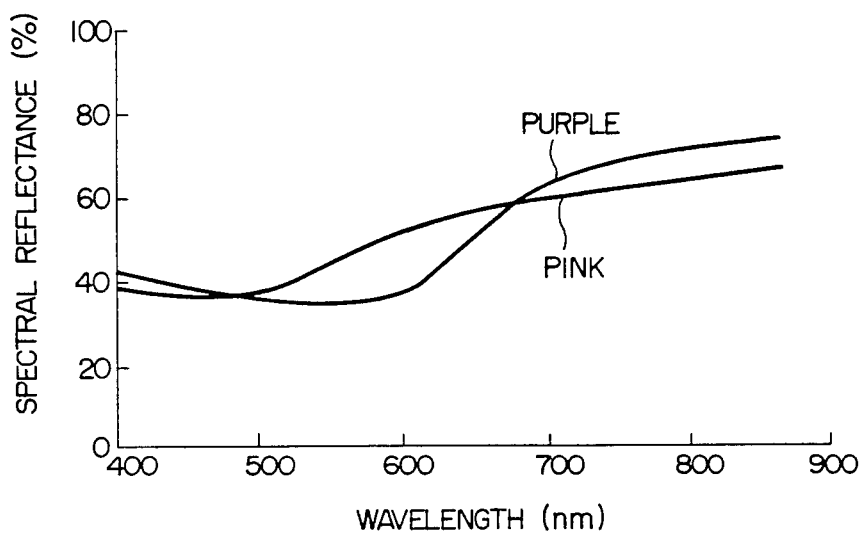

An ingot of Ag-based alloy containing 52 wt % of Cd was produced by alloying at 800° C. Ag and Cd charged in a quartz tube sealed in vacuum state to prevent evaporation of Cd and then subjecting the alloy to homogenizing treatment at 650° C. Powders of this ingot were obtained by filing and were charged in transparent quartz tubes sealed in vacuum state to prevent oxidation of powders. The tubes were then heated at respective temperatures of 650°, 350° and 200° C. for 5 minutes, followed by water-quenching. Consequently, these powders in respective tubes exhibited colors of gray, pink and purple at the room temperature. From this fact, it was judged that the β-phase, ζ-phase and β'-phase have respectively colors of gray, pink and purple at the room temperature. Then, plates of 1 mm thick were cut out from the above-mentioned ingot and, after polishing the surfaces, put in quartz tubes sealed in vacuum state. After heating these tubes at 350° C. and 200° C., respectively, for 5 minutes, the tubes were broken and the plates were water-quenched. The spectral reflectances of these plates were measured to obtain the result as shown in FIG. 20. It will be seen from this Figure that the plate heated at 350° C. (ζ-phase, pink) and the plate heated at 200° C. (β'-phase, purple) exhibited different spectral reflectances over the entire wavelength region except 470 nm and 670 nm, so that these reflectances are distinguishable from each other.

Example 36

An alloy film of Ag-based alloy containing 52 wt % of Cd was formed by sputtering vacuum evaporation to have a thickness of 50 nm on a glass substrate heated beforehand to 200° C., and a protective film of SiO$_2$ of 200 nm thick was coated on the alloy film. The alloy film exhibited a color of purple at the room temperature, but the color was changed to pink when cooled to the room temperature after 1-minute heating at 350° C. The spectral reflectances of both alloy films were measured and a tendency similar to that shown in FIG. 20 was confirmed. The thin film specimen exhibiting purple color over its entire surface was scanned by a semiconductor laser beam having a power of 30 mW and a spot diameter of 2 μm. A pink line of 2 μm wide on the purple substrate was confirmed through an optical-microscopic observation of the portion irradiated with the laser beam. That is, it was confirmed that the information could be recorded. Subsequently, the portion of the alloy film in which the pink line was scribed was scanned with a laser beam having a smaller power density than the scribing laser beam with an increased spot diameter of 5 μm. As a result, the portion in which the pink line had been scribed changed its color to purple, i.e. to the same color as the background, thus enabling the erasure of the recorded information. It was confirmed that this recording and erasing cycle can be conducted repeatedly as desired.

The thin film specimen exhibiting purple color at the room temperature was heated at 350° C. for 1 minute to exhibit pink color over its entire surface, and the pink surface of the specimen was scanned with a laser beam of a power of about 20 mW and having a spot diameter of about 2 μm. In consequence, the portion irradiated with the laser beam changed its color to purple clearly distinguishable from the pink background. Subsequently, the portion of the specimen in which the purple line had been scribed was scanned with a laser beam having a larger power density than the scribing laser beam with an increased spot diameter of 5 μm. As a result, the portion in which the purple line had been scribed changed its color to pink, i.e. to the same color as the background. It was confirmed that this recording and erasing cycle could be conducted repeatedly as desired.

Example 37

Figure 21:
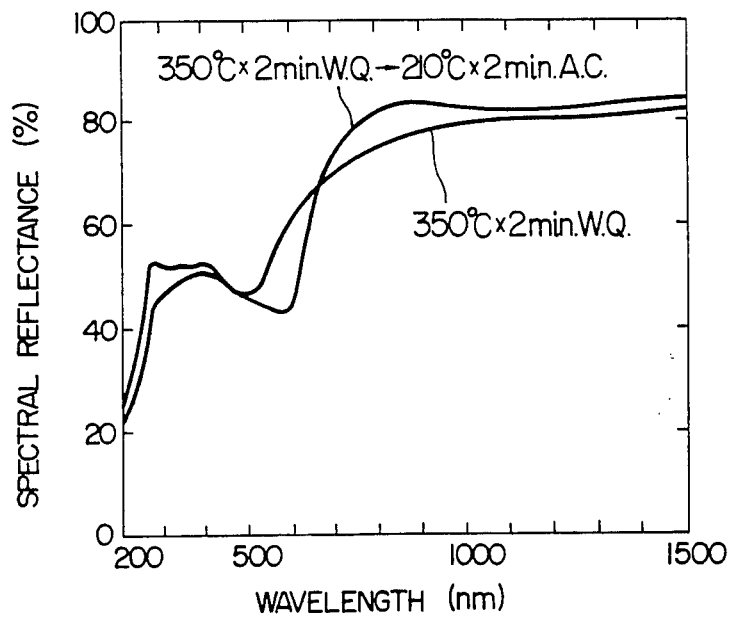

A ribbon-like foil of 30 μm thick was formed by the same method as Example 1 from An Ag-based alloy containing 55 wt % of Cd and 0.25 wt % of Al. The foil exhibited a pink color at the room temperature. When a part of the pink foil was heated at 300° C. for 2 minutes in an Ar gas atmosphere, it still exhibited a color of pink at the room temperature; whereas when it was heated at 200° C. for 2 minutes, it exhibited a color of purple. FIG. 21 shows the spectral reflectances of the foils subjected to the 2-minute heating at 300° C. and 2-minute heating at 200° C. It will be seen from this Figure that the pink foil (ζ-phase) and the purple foil (β'-phase) exhibit different spectral reflectances over the entire wavelength region except the regions around 470 nm and 670 nm and can be distinguished from each other.

Example 38

An alloy film of Ag-based alloy containing 55 wt % of C.d and 0.25 wt % of Al was formed by sputtering vacuum evaporation to have a thickness of 50 nm on a glass substrate heated beforehand to 200° C., and a protective film of $SiO_2$ of 100 nm thick was coated on the alloy film. The alloy film exhibited a color of purple at the room temperature, but the color was changed to pink when cooled to the room temperature after 1-minute heating at 350° C. The spectral reflectances of both alloy films were measured and a tendency similar to that shown in FIG. 21 was confirmed. The thin film specimen exhibiting purple color over its entire surface was scanned by a semiconductor laser beam in the same manner as stated before. A pink line of 2 μm wide on the purple background was confirmed through an optical-microscopic observation of the portion irradiated with the laser beam. Subsequently, the portion of the alloy film in which the pink line had been scribed was scanned with a laser beam having a smaller power density than the scribing laser beam with an increased spot diameter of 5 μm. As a result, the portion in which the pink line had been scribed changed its color to purple, i.e. to the same color as the background. It was confirmed that this recording and erasing cycle could be conducted repeatedly as desired. A similar experiment was conducted by using an Ar laser beam in place of the semiconductor laser beam and the same result was confirmed.

The thin film specimen exhibiting purple color at the room temperature was heated at 350° C. for 1 minute to exhibit pink color over its entire surface, and the pink surface of the specimen was scanned with a laser beam of a power of about 20 mW and having a spot diameter of 2 μm. In consequence, the portion irradiated with the laser beam changed its color to purple clearly distinguishable from the pink background. Subsequently, the portion of the specimen in which the purple line had been scribed was scanned with a laser beam having a larger power density than the scribing laser beam with an increased spot diameter of 5 μm. As a result, the portion in which the purple line had been scribed changed its color to pink, i.e. to the same color as the background. It was confirmed that this recording and erasing cycle could be conducted repeatedly as desired.

Example 39

A ribbon-like foil of about 40 μm thick was prepared by the same method as Example 1, from an Ag-based alloy containing 7.5 wt % of Al and 10 wt % of Cu. This foil exhibited a color of light gold at the room temperature, but changed its color into silver-white as a result of a 2-minute heating at 400° C. followed by an air-cooling. The foil was then heated at 600° C. for 2 minute and then water-quenched. As a result, the color was changed into light gold. The ribbon exhibited a color between light gold and silver-white at temperature range of between 150° and 200° C. and white-silver color at temperature range of between 220° and 500° C. At temperatures of 550° C. or higher, it exhibited a light gold color. This color change is not affected substantially by the time duration of heating. Thus, the foil changed to silver-white color changes its color into light gold by being heated to 600° C. or higher and the light gold color of foil is changed again to silver-white as the foil is heated at temperature below 500° C.

Figure 22:
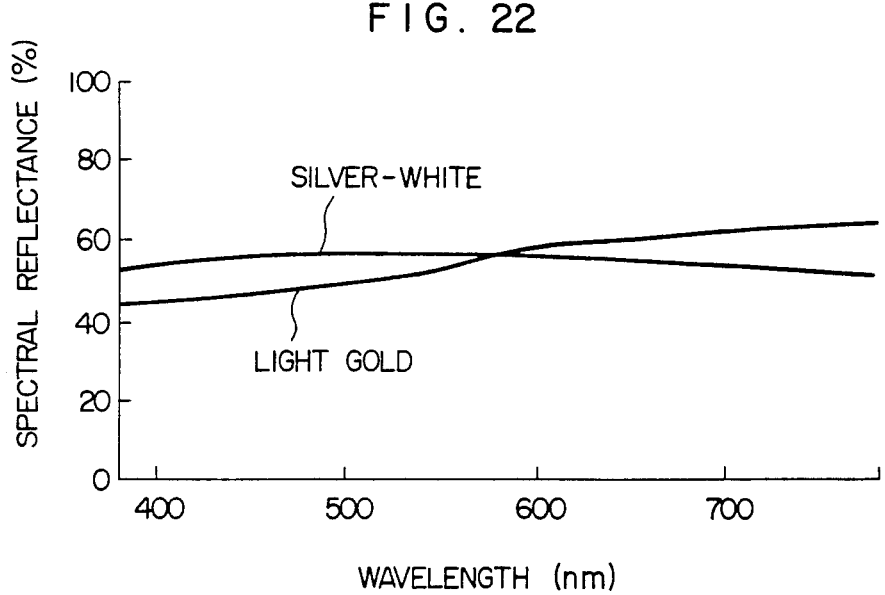

FIG. 22 shows the spectral reflectances of these two heating-quenching modes. It will be seen that each mode exhibits its peculiar pattern of change in the spectral reflectance and both modes are distinguishable over the entire wavelength region except the region of about 580 nm. These two modes of heating-quenching were repeated and a constant reversible change was confirmed, namely, the difference between two modes was maintained.

Example 40

A thin alloy film of the same composition as that in Example 39 was formed to have a thickness of 50 nm on a glass substrate by sputtering vacuum evaporation. A protective film of $Al_2O_3$ or $SiO_2$ was coated by sputtering vacuum evaporation to a thickness of 50 nm on this thin alloy film. The alloy film thus formed exhibited a light gold color but changed its color into silver-white after a 2-minute heating at 550° C. followed by an air-cooling. This alloy film exhibited the spectral reflectance substantially same as that shown in FIG. 22. A specimen of this film, exhibiting silver-white color over its entire surface, was scanned by a semiconductor laser beam in the same manner as stated before. As a result of an observation at the room temperature, it was confirmed that a line of light gold color of a width of about 2 μm was scribed against the silver-white background. Then, the portion of the specimen in which the light gold line had been scribed was scanned with a laser beam of a reduced power or in a slightly out-of-focus condition. As a result, the light gold color of the line was reversibly changed into the silver-white color same as the background. It was confirmed also that this reversible change could take place regardless of the number of repetition. The specimen exhibiting light gold color at the room temperature over its entire surface was scanned by a semiconductor laser of 20 mW power. The portion scanned by the laser beam changed its color at the room temperature into silver-white which is distinguishable from the color of the background.

Example 41

Figure 23:
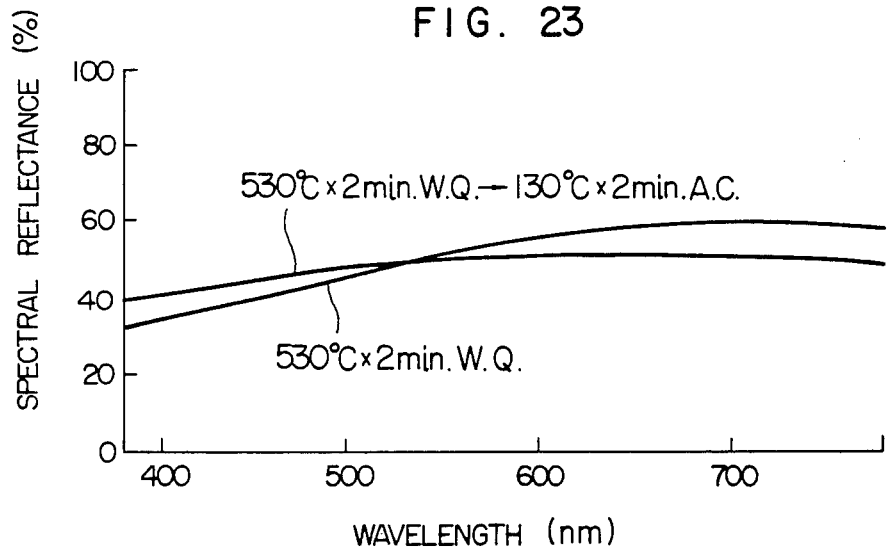

A ribbon-like foil of about 40 μm thick was prepared by the same method as Example 1, from an Au-based alloy containing 2.9 wt % of Al. This foil exhibited a color of light gold at the room temperature, but changed its color into silver-white as a result of a 2-minute heating at 130° C. followed by an air-cooling. The foil was then heated at 350° C. for 2 minute and then water-quenched. As a result, the color was changed into gold. FIG. 23 shows the spectral reflectances of these two heating modes. It will be seen that each mode exhibits its peculiar pattern of change in the spectral reflectance and both modes are distinguishable over the entire wavelength region except the region around 550 nm.

Example 42

A thin alloy film of the same composition as that an Example 41 was formed to have a thickness of 50 nm on a glass substrate by sputtering vacuum evaporation. A protective film of $Al_2O_3$ or $SiO_2$ was coated by sputtering vacuum deposition to a thickness of 50 nm on this thin alloy film. The alloy film thus formed exhibited a light gold color but changed its color into silver-white after a 2-minute heating at 130° C. followed by an air-cooling. This alloy film exhibited the spectral reflectance substantially same as that shown in FIG. 23. A specimen of this film, exhibiting silver-white color over its entire surface, was scanned by a semiconductor laser beam of a spot diameter of about 2 μm and a power of not greater than 30 mW. As a result of an observation at the room temperature, it was confirmed that a line of gold color of a width of about 2 μm was scribed against the silver-white background. Then, the portion of the specimen in which the gold line had been scribed was scanned with a laser beam of a reduced power or in a slightly out-of-focus condition. As a result, the gold color of the line was reversibly changed into the silver-white color same as the background. It was confirmed also that this reversible change could take place regardless of the number of repetition.

The specimen exhibiting gold color at the room temperature over its entire surface was scanned by a semiconductor laser of 20 mW power. The portion scanned by the laser beam changed its color at the room temperature into silver-white which is distinguishable from the color of the background, thus proving the possibility of recording by the laser beam.

What is claimed is:

1. A recording material which can be subjected to a reversible phase change, wherein an information can be recorded by causing a desired portion of said recording material to locally have the phase change, characterized in that said material is comprised of an alloy having in its solid crystalline state at least two different crystalline structures, with one of said at least two different crystalline structures existing at a first temperature higher than room temperature and another of said at least two different crystalline structures existing at a second temperature lower than said first temperature but not lower than room temperature, the crystalline structure of the alloy being reversibly changeable by heating; further characterized in that the alloy is an alloy that exhibits a quenched crystalline structure, when quenched from said first temperature to the second temperature, which is different than the crystalline structure of said another of said at least two different crystalline structures, ordinarily exhibited at said second temperature; further characterized in that the alloy is an alloy that can have information recorded therein by utilizing the reversible phase change between said one of said at least two different crystalline structures at said first temperature and said another of said at least two different crystalline structures at said second temperature; further characterized in that the alloy is selected from the group consisting of (1) a Cu-based alloy containing, by weight, one of 21-30% of Ga, 20-40% of In, 20-28% of Ge and 16-35% of Sn; (2) an Au-based alloy containing, by weight, 2.5-4.0% of Al; (3) an Ag-based alloy containing, by weight, at last one of 6-10% of Al, 0.1-10% of Au and 0.1-15% of Cu; (4) an Ag alloy containing, by weight, 0.01-2.0% of Al and 43-59% of Cd; and (5) an Ag-based alloy containing, by weight, 30-46% of Zn; and further characterized in that the material is in a non-bulk form having such a volume that the phase change from one crystalline structure to a different crystalline structure, of said two different crystalline structures, can be locally effected at a desired location when the material is subjected to incident energy.

2. A recording material according to claim 1, wherein said first temperature is higher than the solid phase transformation temperature.

3. A recording material according to claim 1, wherein said alloy has a crystal grain size of not greater than 0.1 μm.

4. A recording material according to claim 1, wherein said alloy has one of the forms of a thin film, foil, strip, powder and thin wire.

5. A recording material according to claim 1, wherein said material is a non-bulk formed by quenching a melt of said alloy or by quenching a gas of said alloy.

6. A recording material according to claim 5, wherein said material is a foil or a thin wire formed by pouring said melt onto the peripheral surface of a roll made of a material having a high heat conductivity and rotating at a high speed.

7. A recording material according to claim 5, wherein said material is a thin film of said alloy deposited by vacuum evaporation or sputtering.

8. A recording material according to claim 5, wherein said material is made of powder of said alloy formed by atomizing, quenching and solidifying said melt by a cooling medium of liquid or gas.

9. A recording material according to claim 1, wherein said alloy is an alloy that exhibits said quenched crystalline structure when quenched from said first temperature to a lower temperature at a quench rate of at least $10^{2°}$ C./sec.

10. A recording material according to claim 1, wherein said alloy is an alloy that exhibits said quenched crystalline structure when quenched from said first temperature to a lower temperature at a quench rate of at least $10^{3°}$ C./sec.

11. A recording material according to claim 1, wherein said alloy is a Cu-based alloy containing, by weight, one of 21-30% of Ga, 20-40% of In, 20-28% of Ge and 16-35% of Sn.

12. A recording material according to claim 1, wherein said alloy is a Cu-based alloy containing, by weight, 0.01–3.0% of Al and one of 21–30% of Ga, 20–40% of In, 20–28% of Ge and 16–35% of Sn.

13. A recording material according to claim 1, wherein said alloy is an Au-based alloy containing, by weight, 2.5–4.0% of Al.

14. A recording material according to claim 1, wherein said alloy is an Ag-based alloy containing, by weight, at least one of 6–10% of Al, 0.1–10% of Au and 0.1–15% of Cu.

15. A recording material according to claim 1, wherein said alloy is an Ag-based alloy containing, by weight, 0.01–2.0% of Al and 43–59% of Cd.

16. A recording material according to claim 1, wherein said alloy is an Ag-based alloy containing, by weight, 30–46% of Zn.

17. A recording material according to claim 1, wherein said alloy is an alloy which has the reversibel phase change, causing the change between the quenched crystalline structure and the crystalline structure ordinarily exhibited at the second temperature, provided by heating the alloy at a predetermined temperature.

18. A recording material which can be subjected to a reversible phase change, wherein an information can be recorded by causing a desired portion of said recording material to locally have the phase change, characterized in that said material is comprised of an alloy having in its solid crystalline state at least two different crystalline structures, with one of said at least two different crystalline structures existing at a first temperature higher than room temperature and another of said at least two different crystalline structures existing at a second temperature lower than said first temperature but not lower than room temperature, the crystalline structure of the alloy being reversibly changeable by heating; further characterized in that the alloy is an alloy that exhibits a quenched crystalline structure, when quenched from said first temperature to the second temperature, which is different than the crystalline structure of said another of said two different crystalline structures, ordinarily exhibited at said second temperature; further characterized in that the alloy is an alloy that can have information recorded therein by utilizing the reversible phase change between said one of said at least two different crystalline structures at said first temperature and said another of said at least two different crystalline structures at said second temperature; and further characterized in that the alloy is selected from the group consisting of (1) a Cu-based alloy containing, by weight, one of 21–30% of Ga, 20–40% of In, 20–28% of Ge and 16–35% of Sn; (2) an Au-based alloy containing, by weight, 2.5–4.0% of Al; (3) an Ag-based alloy containing, by weight, at least one of 6–10% of Al, 0.1–10% of Au and 0.1–15% of Cu; (4) an Ag alloy containing, by weight, 0.01–2.0% of Al and 43–59% of Cd; and (5) an Ag-based alloy containing, by weight, 30–46% of Zn.

19. A recording material according to claim 18, wherein said alloy is a non-bulk material.

20. A recording material according to claim 18, wherein said alloy has a crystal grain size of not greater than 0.1 μm.

21. A recording material according to claim 18, wherein said alloy has one of the forms of a thin film, foil, strip, powder and thin wire.

22. A recording material according to claim 18, wherein said alloy is a Cu-based alloy containing, by weight, one of 21–30% of Ga, 20–40% of In, 20–28% of Ge and 16–35% of Sn.

23. A recording material according to claim 18, wherein said alloy is a Cu-based alloy containing, by weight, 0.01–3.0% of Al and one of 21–30% of Ga, 20–40% of In, 20–28% of Ge and 16–35% of Sn.

24. A recording material to claim 18, wherein said alloy is an Au-based alloy containing, by weight, 2.5–4.0% of Al.

25. A recording material according to claim 18, wherein said alloy is an Ag-based alloy containing, by weight, at least one of 6–10% of Al, 0.1–10% of Au and 0.1–15% of Cu.

26. A recording material according to claim 18, wherein said alloy is an Ag alloy containing, by weight, 0.01–2.0% of Al and 43–59% of Cd.

27. A recording material according to claim 18, wherein said alloy is an Ag-based alloy containing, by weight, 30–46% of Zn.

28. A recording material according to claim 18, wherein the spectral reflectance of the one of said at least two different crystalline structures is different than that of said another of said at least two different crystalline structures.

29. A recording material according to claim 28, wherein the difference in spectral reflectance between the one crystalline structure and the another crystalline structure is at least 5%.

30. A recording material according to claim 29, wherein the difference in spectral reflectance is at least 10%.

31. A recording material which can be subjected to a reversible phase change, wherein an information can be recorded by causing a desired portion of said recording material to locally have the phase change, characterized in that said material is comprised of an alloy having in its solid crystalline state at least two different crystalline structures, with one of said at least two different crystalline structures existing at a first temperature higher than room temperature and another of said at least two different crystalline structures existing at a second temperature lower than said first temperature but not lower than room temperature, the crystalline structure of the alloy being reversibly changeable by heating; further characterized in that the alloy is an alloy that exhibits a quenched crystalline structure, when quenched from said first temperature to the second temperature, which is different than the crystalline structure of said another of said at least two different crystalline structures, ordinarily exhibited at said second temperature; further characterized in that the alloy is an alloy that can have information recorded therein by utilizing the reversible phase change between said one of said at least two different crystalline structures at said first temperature and said another of said at least two different crystalline structures at said second temperature; further characterized in that the alloy is a Cu-based alloy containing, by weight, 14–16.5% of Al; and further characterized in that the material is in a non-bulk form having such a volume that the phase change from one crystalline structure to a different crystalline structure, of said two different crystalline structures, can be locally effected at a desired location when the material is subjected to incident energy.

32. A recording material according to claim 31, wherein said Cu-based alloy contains, in addition to 14–16.5% of Al, 0.01–20% of Ni.

33. A recording material according to claim 31, wherein said Cu-based alloy contains, in addition to 14–16.5% of Al, 0.01–10% of Fe.

34. A recording material according to claim 31, wherein said Cu-based alloy contains, in addition to 14–16.5% of Al, 0.1–15% of Mn.

35. A recording material which can be subjected to a reversible phase change, wherein an information can be recorded by causing a desired portion of said recording material to locally have the phase change, characterized in that said material is comprised of an alloy having in its solid crystalline state at least two different crystalline structures, with one of said at least two different crystalline structures existing at a first temperature higher than room temperature and another of said at least two different crystalline structures existing at a second temperature lower than said first temperature but not lower than room temperature, the crystalline structure of the alloy being reversibly changeable by heating; further characterized in that the alloy is an alloy that exhibits a quenched crystalline structure, when quenched from said first temperature to the second temperature, which is different than the crystalline structure of said another of said two different crystalline structures, ordinarily exhibited at said second temperature; further characterized in that the alloy is an alloy that can have information recorded therein by utilizing the reversible phase change between said one of said at least two different crystalline structures at said first temperature and said another of said at least two different crystalline structures at said second temperature; and further characterized in that the alloy is a Cu-based alloy containing, by weight, 14–16.5% of Al.

36. A recording material according to claim 35, wherein said Cu-based alloy contains, in addition to 14–16.5% of Al, 0.01–20% of Ni.

37. A recording material according to claim 35, wherein said Cu-based alloy contains, in addition to 14–16.5% of Al, 0.0–10% of Fe.

38. A recording material according to claim 35, wherein said Cu-based alloy contains, in addition to 14–16.5% of Al, 0.1–15% of Mn.

* * * * *